United States Patent
Schleiss et al.

(10) Patent No.: US 8,379,546 B2
(45) Date of Patent: Feb. 19, 2013

(54) METHODS AND APPARATUS TO COMMUNICATIVELY COUPLE A PORTABLE DEVICE TO PROCESS CONTROL DEVICES IN A PROCESS CONTROL SYSTEM

(75) Inventors: Trevor Duncan Schleiss, Austin, TX (US); Andre A. Dicaire, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 324 days.

(21) Appl. No.: 12/755,169

(22) Filed: Apr. 6, 2010

(65) Prior Publication Data

US 2011/0245932 A1 Oct. 6, 2011

(51) Int. Cl.
*H04B 7/00* (2006.01)
*H04J 3/16* (2006.01)
*G06F 15/16* (2006.01)

(52) U.S. Cl. ......... 370/277; 370/465; 709/202; 709/227
(58) Field of Classification Search .................. None
See application file for complete search history.

(56) References Cited

U.S. PATENT DOCUMENTS

| | | | |
|---|---|---|---|
| 6,853,920 | B2 | 2/2005 | Hsiung et al. |
| 7,336,602 | B2 | 2/2008 | Silvester |
| 2003/0061295 | A1 | 3/2003 | Oberg et al. |
| 2004/0259533 | A1 | 12/2004 | Nixon et al. |
| 2007/0130260 | A1* | 6/2007 | Weintraub et al. ............ 709/204 |
| 2007/0130572 | A1 | 6/2007 | Gilbert et al. |
| 2007/0242690 | A1 | 10/2007 | Raghavendra et al. |
| 2008/0081579 | A1 | 4/2008 | Chen et al. |
| 2008/0126665 | A1 | 5/2008 | Burr et al. |
| 2010/0115019 | A1* | 5/2010 | Weintraub et al. ............ 709/202 |

FOREIGN PATENT DOCUMENTS

| | | |
|---|---|---|
| GB | 2452635 | 3/2009 |
| GB | 2466122 | 6/2010 |
| GB | 2477443 | 8/2011 |

OTHER PUBLICATIONS

Intellectual Property Office, Search and Examination Report, issued for Great Britain Patent Application Serial No. GB1105392.3, on Jul. 28, 2011, (2 pages).
Emerson Process Management, "Product Data Sheet: 475 Field Communicator," www.fieldcommunicator.com, Jul. 2009, 8 pages.
Intellectual Property Office, Examination Report under Section 18(3), issued on Mar. 5, 2012, for application No. GB1105392.3, 1 page.

* cited by examiner

*Primary Examiner* — Clemence Han
(74) *Attorney, Agent, or Firm* — Hanley, Flight & Zimmerman, LLC

(57) ABSTRACT

Example methods and apparatus to communicatively couple a portable device to process control devices in a process control system are disclosed. A disclosed example method includes receiving via a wireless module a selection of an I/O channel from a portable device, determining a process control device associated with the selected I/O channel, initiating a pass-through session from the wireless module to the determined process control device via the I/O channel, and enabling communication between the portable device and the process control device via the pass-through session to communicatively couple the portable device to the process control device.

25 Claims, 11 Drawing Sheets

METHODS AND APPARATUS TO COMMUNICATIVELY COUPLE A PORTABLE DEVICE TO PROCESS CONTROL DEVICES IN A PROCESS CONTROL SYSTEM

FIELD OF THE DISCLOSURE

The present disclosure relates generally to process control systems and, more particularly, to methods and apparatus to communicatively couple a portable device to process control devices in a process control system.

BACKGROUND

Process control systems, like those used in chemical, petroleum or other processes, typically include one or more controllers and input/output (I/O) devices communicatively coupled to at least one host or operator workstation and to one or more process control devices via analog, digital or combined analog/digital buses. The process control devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the process control devices, process this information to implement a control routine, and generate control signals that are sent over the buses or other communication lines to the process control devices to control the operation of the process. In this manner, the controllers may execute and coordinate control strategies or routines using the process control devices via the buses and/or other communication links communicatively coupling the process control devices.

Process control operators and/or engineers may troubleshoot, monitor, diagnose, and/or analyze process control devices in a process control system. Currently, an operator may analyze a process control device through a workstation coupled to a process control device via an I/O device and a corresponding controller. Alternatively, an operator may analyze a process control device by physically coupling a meter and/or an analyzer to an I/O device with terminations to a communication path connected to the process control device.

However, in relatively large or complex systems, a controller, a cabinet of I/O devices, a field junction box, and/or any other termination area may include tens, hundreds, or thousands of communication paths to process control devices. This multitude of communication paths and terminations makes it relatively difficult and time consuming for an operator to locate a specific communication path to a process control device. Further, an operator may introduce errors to the process control system by physically connecting an analyzer and/or meter to an incorrect termination in an I/O device and/or a process control device.

SUMMARY

Example methods and apparatus to communicatively couple a portable device to process control devices in a process control system are described. A disclosed example method includes receiving via a wireless module a selection of an I/O channel from a portable device and determining a process control device associated with the selected I/O channel. The example method also includes initiating a pass-through session from the wireless module to the determined process control device via the I/O channel and enabling communication between the portable device and the process control device via the pass-through session to communicatively couple the portable device to the process control device.

A disclosed example apparatus includes a wireless processor to receive a selection of an I/O channel from a portable device and a wireless module channel manager to initiate a pass-through session from the wireless module to a corresponding process control device via the I/O channel. The example apparatus further includes an I/O component interface to enable communication between the portable device and the process control device via the pass-through session to communicatively couple the portable device to the process control device.

DETAILED DESCRIPTION

Figure 1:
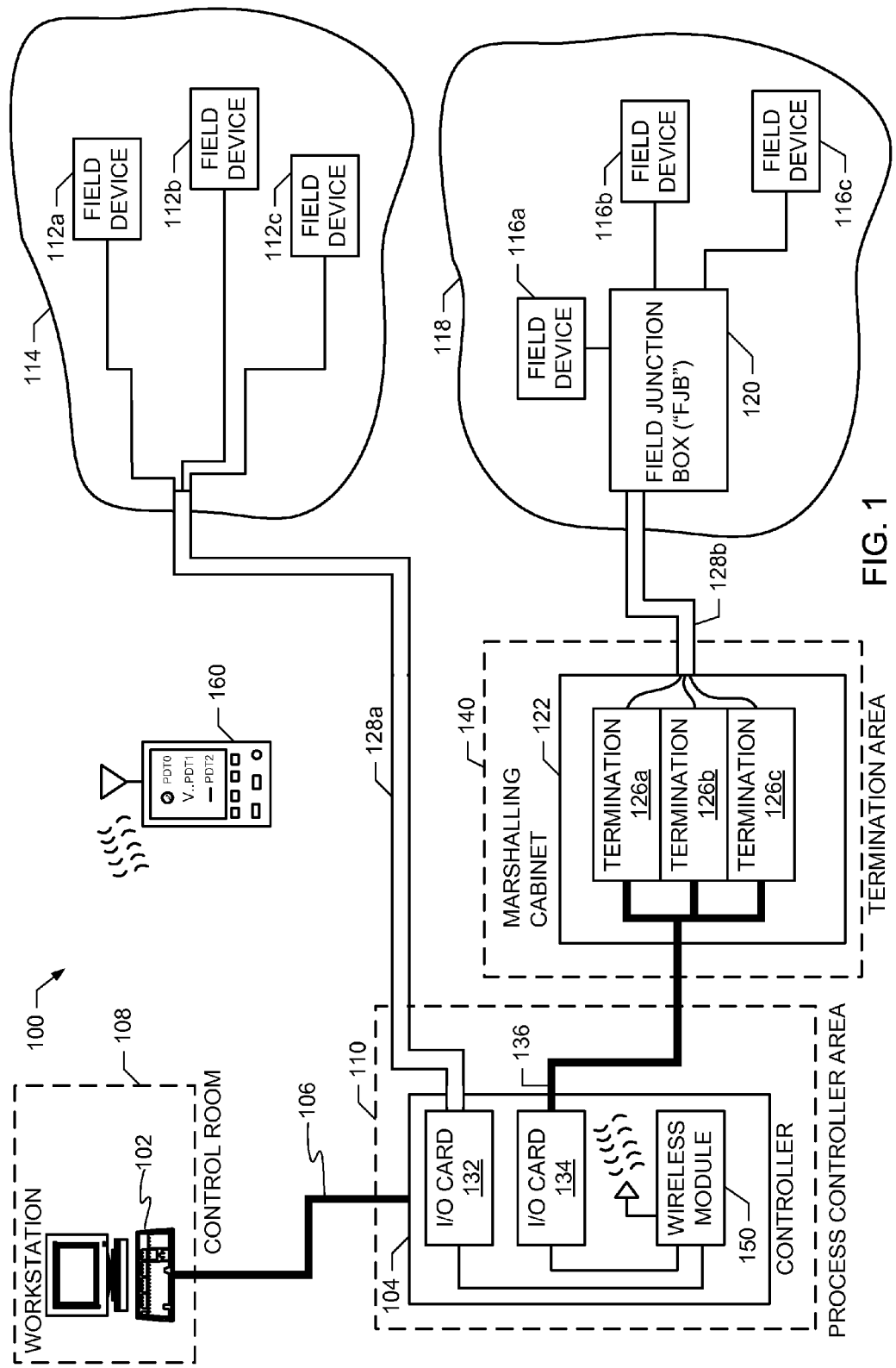
FIG. 1 is a block diagram showing an example process control system with an example wireless module coupled to an I/O card within a controller.

Although the following describes example methods and apparatus including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and apparatus, the examples provided are not the only way to implement such methods and apparatus. Further, while the example methods and apparatus are described implementing a Bluetooth® wireless communication medium, the example methods and apparatus may implement other wireless communication media including, but not limited to, wireless Ethernet, IEEE-802.11, Wi-Fi®, RuBee IEEE 1901.1, or Zigbee®.

Currently, a process control operator and/or engineer physically connects wires to a communication path to couple a handheld diagnostic device to a process control device to monitor, analyze, and/or debug an issue with the process control device. In many cases, the operator has to travel to the portion of the process control system with the controller and/or termination area where the operator can attach the handheld device. Additionally, an operator can only couple a diagnostic device to a single communication path and/or to one process control device. Connecting the diagnostic module can become relatively burdensome because the I/O cards, controllers, and/or termination areas may include hundreds of different communication paths to hundreds of process control devices. In many instances, an operator can spend a significant amount of time searching for the correct communication path.

Additionally, the multitude of communication paths in a controller, I/O card, and/or termination area can create operator confusion resulting in a diagnostic tool being improperly connected to a communication path. Such an improper or wrong connection could result in damage to a process control device, deactivation of a properly operating process control device, and/or a command being sent to a process control device that causes the process control device to function improperly. In other examples, an improper connection can mislead an operator to analyze data from the wrong process control device and possibly delay troubleshooting of another process control device experiencing an operational issue.

The example methods and apparatus described herein enable an operator to use a portable device to communicate wirelessly with a controller, I/O card, and/or other I/O component to establish a pass through session to a process control device. The example methods and apparatus utilize a wireless module that is communicatively coupled to an I/O component so that the wireless module can receive communications from the portable device and forward those communications to the I/O component as if the operator were transmitting those communications from a workstation in a control room. Further, the portable device can query the I/O component for communicatively coupled process control devices and/or available I/O channels on an I/O card and select one or more process control devices and/or I/O channels to create a virtual route (e.g., a communication session, communication link, or tunnel). A virtual route is a logical route that is dedicated to communications between the portable device and a process control device via the example wireless module, I/O component, I/O channel, and communication path.

Upon creating a virtual route to a process control device, the portable device may communicate with a process control device as though the operator had physically connected wires to a communication path or terminations within an I/O component. In this manner, the operator may view a status of a process control device and/or a status of a group of process control devices coupled to a common I/O component by sending a command from the portable wireless device. Thus, the methods and apparatus described herein provide a wireless solution that enables process control operators or engineers to use a portable device to communicatively couple to one or more process control devices without the operator having to physically locate the desired communication path or termination.

Furthermore, in instances where the operator may be within range of two or more wireless modules, the operator may browse which process control devices are associated with the wireless modules and select an appropriate wireless module. The operator may also use the portable device described herein to determine the organization of process control devices coupled to a common I/O component. Additionally, the methods and apparatus described herein may activate an indicator on an I/O component, I/O channel, and/or process control device that an operator may select via the portable device. Activating an indicator may include flashing a light or LED on an I/O component and/or on an I/O channel of an I/O card. By activating an indicator, an operator may visually confirm which I/O component, I/O channel, and/or process control device is communicatively coupled to the portable device.

Also, because the example methods and apparatus described herein forward communications from the example portable device to an I/O component that formats (e.g., packetizes) the communication for transmission to a process control device, the example methods and apparatus may utilize any communication protocol that is supported by the I/O component. Communication protocols used in a process control system may include Highway Addressable Remote Transducer ("HART®"), wireless HART®, FOUNDATION™ Fieldbus, Profibus®, etc. Further, because the example methods and apparatus provide a pass-through communication session with an I/O component and/or process control device, the example methods and/or apparatus may be installed and/or configured in pre-existing process control or industrial systems without requiring upgrades to hardware and/or software.

In FIG. 1, an example process control system 100 includes a workstation 102 communicatively coupled to a controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP).

The controller 104 may be configured to perform one or more process control routines or functions that have been generated by a system engineer or other system operator using, for example, the workstation 102 or any other workstation and which have been downloaded to and instantiated in the controller 104. In the illustrated example, the workstation 102 is located in a control room 108 and the controller 104 is located in a process controller area 110 separate from the control room 108.

In the illustrated example, the example process control system 100 includes process control devices 112a-c in a first process area 114 and process control devices 116a-c in a second process control area 118. A field junction box (FJB) 120 routes signals from the process control devices 116a-c to a marshalling cabinet 122 in a termination area 140. To route information associated with the process control devices 116a-c in the marshalling cabinet 122, the marshalling cabinet 122 is provided with the plurality of termination modules 126a-c. The termination modules 126a-c are configured to marshal information associated with the process control devices 116a-c in the second process area 118.

The illustrated example of FIG. 1 depicts a point-to-point configuration in which each conductor or conductor pair (e.g., bus, twisted pair communication medium, two-wire communication medium, etc.) in multi-conductor cables 128a-b (e.g., communication paths) communicates information uniquely associated with a respective one of the process control devices 112a-c and 116a-c. In the depicted example implementation, the multi-conductor cable 128a communicatively couples the process control devices 112a-c directly to an I/O card 132 and the multi-conductor cable 128b communicatively couples the process control devices 116a-c to an I/O card 134 via the respective termination modules 126a-c and the field junction box 120. The marshalling cabinet 122 marshals (e.g., organizes, groups, etc) information received from the FJB 120 and routes the process control device information to the I/O card 134 of the controller 104. In an alternative example implementation in which the marshalling cabinet 122 is omitted, the termination modules 126a-c can be installed in the field junction box 120.

The process control devices 112a-c and 116a-c may be Fieldbus compliant valves, actuators, sensors, etc., in which case the process control devices 112a-c and 116a-c communicate via a digital data bus using the well-known Fieldbus communication protocol. Of course, other types of process control devices and communication protocols could be used instead. For example, the process control devices 112a-c and 116a-c could instead be Profibus®, HART™, or AS-i compliant devices that communicate via the data bus using the well-known Profibus® and HART™ communication protocols. In some example implementations, the process control devices 112a-c and 116a-c can communicate information using analog communications or discrete communications instead of digital communications. In addition, the communication protocols can be used to communicate information associated with different data types.

In the illustrated example, the I/O card 132 is configured to control I/O communications between the controller 104 (and/or the workstation 102) and the process control devices 112a-c in the first process area 114. Additionally, the I/O card 134 is configured to control I/O communications between the controller 104 (and/or the workstation 102) and the process control devices 116a-c in the second process area 118. The I/O cards 132 and 134 may include one or more I/O channels (and/or a characterization module (CHARM) that converts digital bus data into an appropriate communication protocol for a process control device) that interface with the respective process control devices 112a-c and 116a-c. I/O channels are partitions of an I/O card (e.g., a CHARM I/O card (CIOC)) that enable an I/O card to be communicatively coupled to many process control devices with different communication protocols. I/O channels also provide organization to an I/O card by having a defined static interface to a process control device that the I/O card can consistently utilize to route communications to the process control device.

In some example implementations, the I/O cards 132 and 134 may include an I/O channel for each for process control device. For example, the IO card 132 may include a first I/O channel communicatively coupled to the process control device 112a via the multi-conductor cable 128a, a second I/O channel communicatively coupled to the process control device 112b, and a third I/O channel communicatively coupled to the process control device 112c. Alternatively, the I/O card 132 may include an I/O channel that is communicatively coupled to the three process control devices 112a-c if the process control devices 112a-c have the same communication protocol.

To enable communications between the termination modules 126a-c and the I/O card 134, the termination modules 126a-c are communicatively coupled to the I/O card 134 via a universal I/O bus 136. Unlike the multi-conductor cables 128a-b, which use separate conductors or communication mediums for each one of the process control devices 112a-c and 116a-c, the universal I/O bus 136 is configured to communicate information corresponding to a plurality of process control devices (e.g., the process control devices 116a-c) using the same communication medium. For example, the communication medium may be a serial bus, a two-wire communication medium (e.g., twisted-pair), an optical fiber, a parallel bus, etc. via which information associated with two or more process control devices can be communicated using, for example, packet-based communication techniques, multiplexing communication techniques, etc. The termination modules 126a-c convert the process control device information into a digital packet-based protocol to communicate with the I/O card 134 via the universal I/O bus 136.

The example controller 104 of FIG. 1 includes a wireless module 150 that is communicatively coupled to the I/O cards 132 and 134. FIG. 1 also shows a portable device 160 that is wireless communicatively coupled to the example wireless module 150. The example portable device 160 may be implemented using a handheld process control processor (e.g., the Emerson™ 475 Field Communicator) specifically designed to communicate with process control devices (e.g., the process control devices 112a-c and 116a-c). Alternatively, the portable device 160 may be implemented using a laptop, a smartphone, a personal digital assistant (PDA), and/or a cellular phone that includes process control communication and processing software.

The example wireless module 150 of FIG. 1 may be installed in an I/O slot within the controller 104 such that the wireless module 150 may be communicatively coupled to the controller 150 and/or the I/O cards 132 and 134. FIG. 1 shows the wireless module 150 coupled to the I/O cards 132 and 134. However, in other examples, the wireless module 150 may be coupled to the controller 104 and/or other I/O cards within the controller 104. Further, the process control system 100 may include other controllers with other wireless modules.

The example wireless module 150 includes functionality to receive wireless communications from the portable device 160 and forward those communications to the controller 104 and/or the I/O cards 132 and 134 (e.g., I/O components). The wireless module 150 may forward the communications to the I/O components in a wireless communication protocol. The I/O components may then unpack the communication from the wireless communication protocol, package the communication in accordance with a protocol compatible with the process control device, and transmit the communication to the appropriate process control device. In other examples, the wireless module 150 may unpack the wireless communication and forward the unpacked communication to the I/O component. Additionally, the wireless module 150 may receive communications from the controller 104 and the I/O cards 132 and 134, package the communications in accordance with a wireless communication protocol, and transmit the packaged communications to the portable device 160. The portable device 160 may communicate with the wireless module 150 using any wireless communication protocol (e.g., wireless Ethernet, IEEE-802.11, Wi-Fi®, Bluetooth®, etc.).

To communicate with the process control devices 112a-c and 116a-c, the I/O cards 132 and 134, and/or the controller 104, the portable device 160 may send a connect message, a request message, and/or an identification request message to the wireless module 150. The wireless module 150 receives the message(s) and establishes a communication link (e.g., a Bluetooth® link) with the portable device 160. The wireless module 150 may also forward the connect message to the controller 104 and/or the I/O cards 132 and 134, which may then prompt the portable device 160 for authentication information. The request for authentication information ensures that only authorized users and/or portable devices may communicate with the components of the process control system 100.

If the portable device 160 is authenticated, the wireless module 150 may transmit to the portable device 160 a list of available I/O cards, I/O channels, and/or process control devices. An operator may then select via the portable device 160 the desired I/O cards, I/O channel, and/or process control device. Upon selecting an I/O card and/or an I/O channel, the wireless module 150 initiates a pass-though session to the selected I/O component. Additionally, if a process control device is selected, the example wireless module 150 enables communication with the selected process control device via the pass-through session. The pass-through session may be a logical communication link, virtual route, and/or tunnel from the wireless module 150 to the process control device via an I/O card, I/O channel, communication path, FJB, and/or marshalling cabinet.

In the example of FIG. 1, the portable device 160 may be used to select and enable communication with the process control device 116a. To initiate a pass-through session, an operator moves the portable device 160 within range of the wireless module 150 to establish a communication link. The operator may then view options to select the I/O cards 132 and/or 134, and/or any of the process control devices 112a-c and 116a-c because these devices are communicatively coupled to the controller 104.

Upon selecting the process control device 116a, the example wireless module 150 initiates a pass-through session by defining a virtual route from the wireless module 150 to the I/O card 134 and an I/O channel on the I/O card 134 that is associated with the process control device 116a. The appropriate I/O channel may be determined by the I/O card 134 based on identification information (e.g., an identification tag of the field device 116a) sent by the portable device 160 to select an I/O channel and/or process control device. Because the communication path through the universal I/O bus 136, the termination module 126a, and the second multi-conductor cable 128b are already determined for routing communications from the I/O card 134 to the process control device 116a, the virtual route in this example is established once the appropriate I/O channel is determined. In other examples where there may be other layers of routing I/O components, the wireless module 150 may also send messages to those I/O components to establish the virtual route.

Once the virtual route is created, the wireless module 150 enables direct communication from the portable device 160 to the process control device 116a as if the wireless module 150 was physically connected to the termination module 126a, the I/O card 134, the controller 104, and/or the process control device 116a. In this manner, an operator may use the portable device 160 to send commands to the process control device 116a requesting status information, diagnostic information, output values of the process control device 116a, and/or any other process control device information. Additionally, the portable device 160 may send commands that actuate the process control device 116a or cause a change in an output of the process control device 116a. When the operator is finished communicating with the process control device 116a, the operator may close the pass-through session by sending an appropriate command to the wireless module 150.

In other examples, the operator may use the wireless module 160 to view the status of multiple process control devices (e.g., the process control devices 112a-c and 116a-c) on a single user interface by establishing a pass-through session to the controller 104. In this manner, the wireless device 160 enables an operator to view process control information that would normally be available at the workstation 102 on the portable device 160 within the process control system 100 and within wireless communication proximity or range of the wireless module 150. Upon viewing the status of multiple devices, the operator may then communicate directly with one or more of the devices. Further, in examples where the portable device 160 is within range of multiple wireless modules 150, each connected to different parts of the process control system 100, the portable device 160 may provide an operator with an option to view I/O components and/or process control devices associated with each wireless module so that the operator can select a wireless module to initiate a pass-through communication session.

Figure 2:
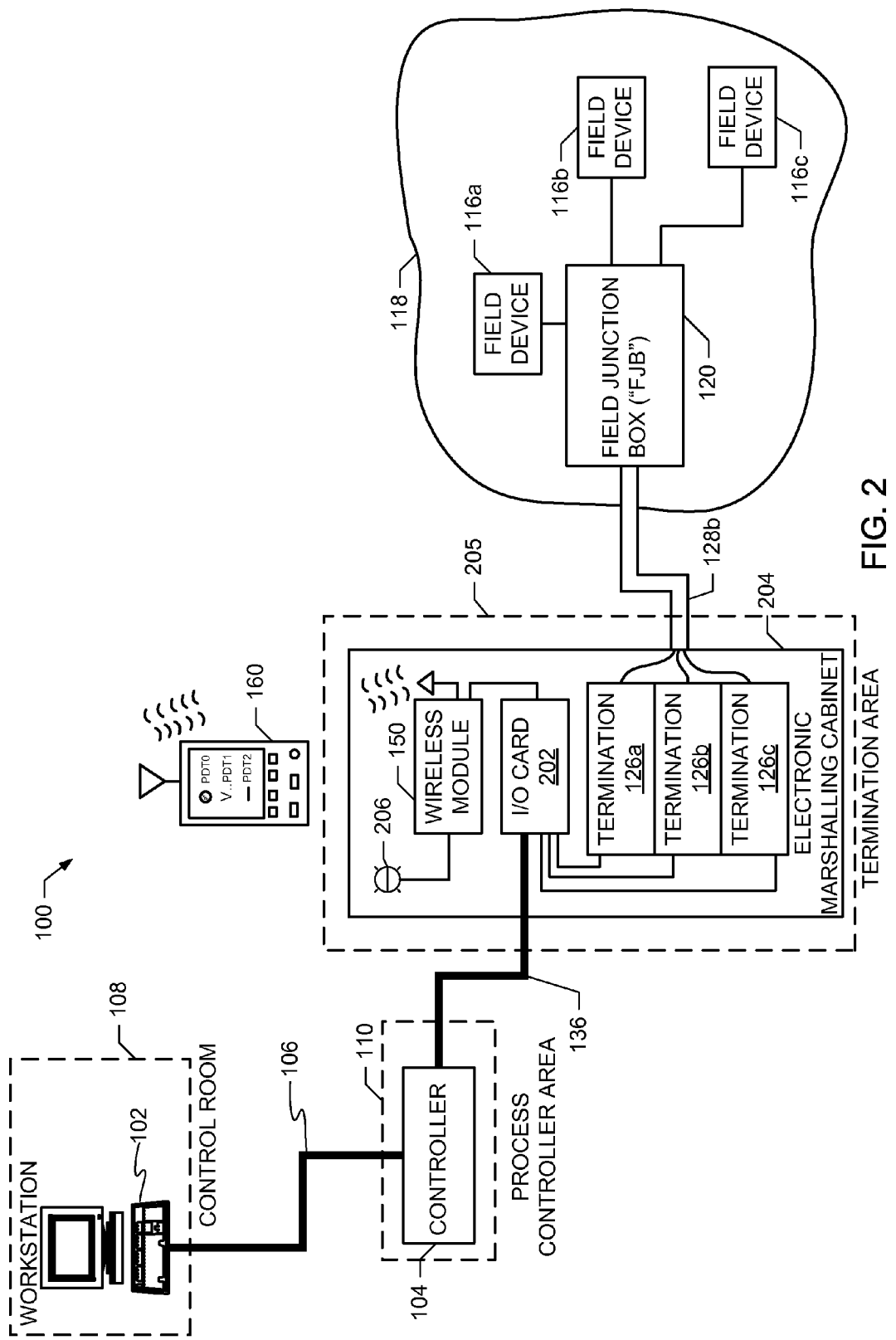
FIG. 2 is a block diagram of the process control system of FIG. 1 with the example wireless module coupled to an I/O card within an electronic marshalling cabinet.

FIG. 2 is a block diagram of the process control system 100 of FIG. 1 with the example wireless module 150 coupled to an I/O card 202. In this example, the electronic marshalling cabinet 204 replaces the marshalling cabinet 122 of FIG. 1 but includes the termination modules 126a-c communicatively coupled to the process control devices 116a-c. The electronic marshalling cabinet 204 of FIG. 2 differs from the marshalling cabinet 122 of FIG. 1 by the addition of the I/O card 202 to the electronic marshalling cabinet 204. Additionally, the electronic marshalling cabinet 204 is physically located in a termination area 205 that may be separate from the termination area 140 of FIG. 1.

The I/O card 202 is coupled to each of the termination modules 126a-c via a respective wire or wires (e.g., communication path) and communicatively coupled to the controller 110 via the universal I/O bus 136. In this manner, the I/O card 202 multiplexes and/or manages communications from the process control devices 116a-c via a common communication path. Further, in communications from the controller 110, the I/O card 202 determines the destination process control device from address information within a header of the communications and routes those communications to the corresponding termination module via an associated I/O channel within the I/O card 202. The I/O channel may then transmit the communications to the target process control device. In other examples, the I/O card 202 may be included within the FJB 120 of FIG. 2.

The example wireless module 150 of FIG. 2 is communicatively coupled to the I/O card 202 in the same manner as the wireless module 150 is communicatively coupled to the I/O cards 132 and 134 in FIG. 1. Similarly, the wireless module 150 may create a pass-though communication session utilizing I/O channels within the I/O card 202 to enable the portable device 160 to communicate with the process control devices 116a-c. However, in the example of FIG. 2, the wireless module 150 is coupled to the I/O card 202 outside of the controller 104. Because the wireless module 150 is coupled only to the I/O card 202, the portable device 160 may only establish a pass-through session with the process control devices 116a-c communicatively coupled to the I/O card 202. Also, because the I/O card 202 is coupled directly to the termination modules 126a-c, a virtual route established by the wireless module 150 to the process control devices 116a-c does not need to be logically defined across the universal I/O bus 136.

Additionally, the wireless module 150 is communicatively coupled to an indicator 206. The wireless module 150 may activate the indicator 206 upon receiving a request to connect message from the portable device 160. Additionally or alternatively, the wireless module may activate the indicator 206 upon establishing a communication link with the portable device 160, upon establishing a pass-though session, and/or upon enabling communication between a process control device and the portable device 160. Further, the wireless module 150 may deactivate the indicator 206 upon disconnecting, ending and/or terminating the communication link with the portable device 160.

The indicator 206 provides a visual and/or audio alert to an operator. The operator may use the indicator 206 as a confirmation of which I/O card is connecting to the portable device 160. In some examples, the indicator 206 may include a blinking or solid light source (e.g., a light-emitting diode). In other examples, the indicator 206 may include an audio signal from a speaker. In yet other examples, the indicator 206 may include information displayed on a display screen.

Figure 3:
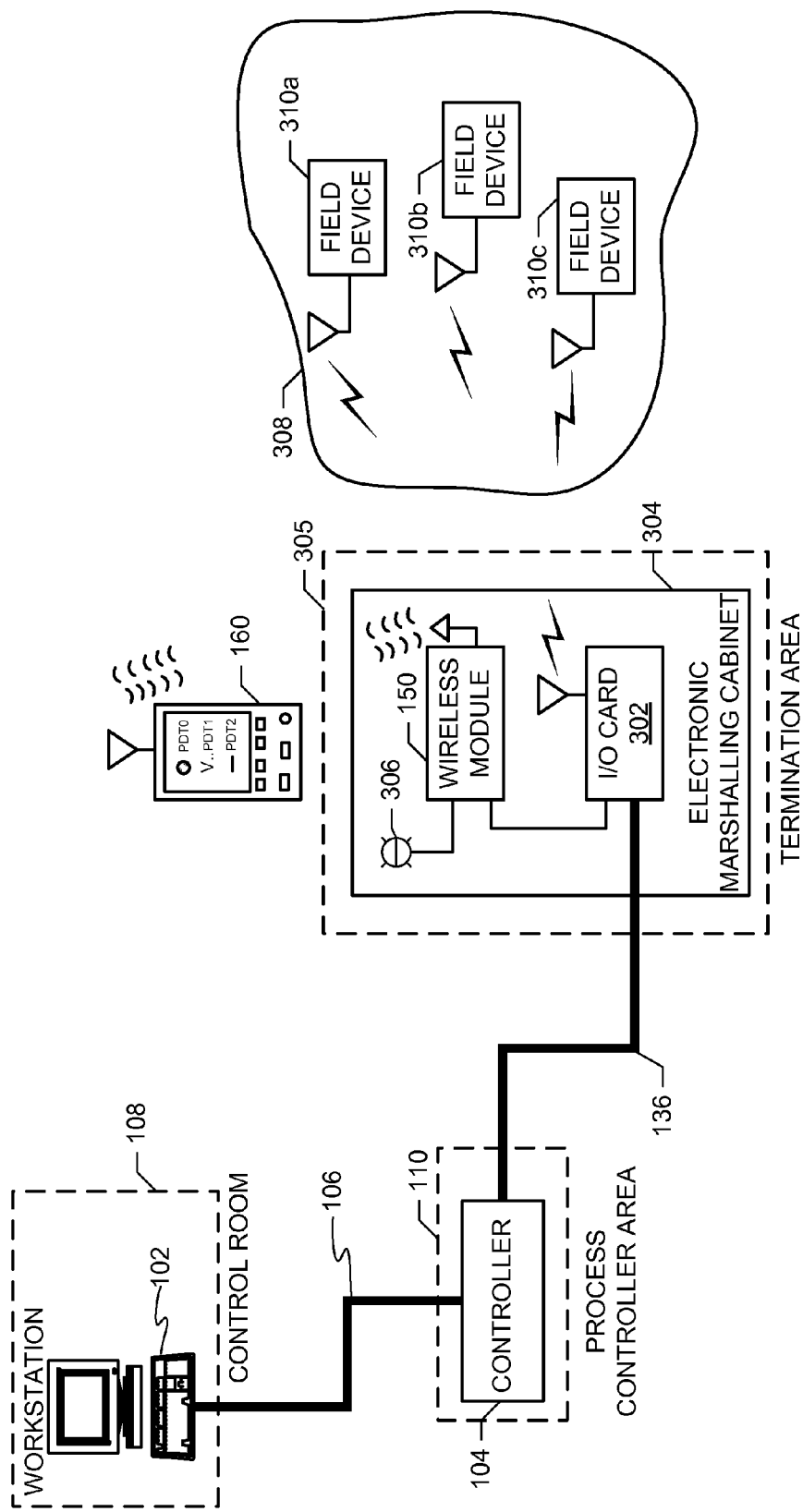
FIG. 3 is a block diagram of the process control system of FIG. 1 with the example wireless module coupled to a wireless I/O card.

FIG. 3 is a block diagram of the process control system 100 of FIG. 1 with the example wireless module 150 coupled to a wireless I/O card 302. The wireless I/O card 302 and the wireless module 150 are physically located in an electronic marshalling cabinet 304 within a termination area 305 that may be located in a different area than the electronic marshalling cabinet 204 of FIG. 2 and/or the marshalling cabinet 122 of FIG. 1. Additionally, the wireless I/O card 302 is communicatively coupled to the controller 104 via the universal I/O bus 136.

Similar to the indicator 206 of FIG. 2, the example wireless module 150 of FIG. 3 is communicatively coupled to an indicator 306. The indicator 306 may alert an operator and/or an engineer that the portable device 160 is connected to the I/O card 302. Additionally, the wireless module 150 is communicatively coupled to the wireless I/O card 302 in the same manner as the wireless module 150 is coupled to the I/O card 202 in FIG. 2 and to the I/O cards 132 and 134 in FIG. 1. However, in FIG. 3, the wireless I/O card 302 is wirelessly communicatively coupled to process control devices 310a-c located in a process control area 308. The process control devices 210a-c may be wirelessly coupled to the wireless I/O card 302 via any wireless communication protocol including wireless HART®, wireless Ethernet, IEEE-802.11, Wi-Fi®, Bluetooth®, etc.

In the example of FIG. 3, the wireless I/O card 302 may manage the frequencies, I/O channels, and wireless channels associated with the process control devices 310a-c. The example wireless module 150 may create a pass-through session in the same manner as described in FIGS. 1 and 2. However, in FIG. 3, the virtual route through the wireless I/O card 302 includes the wireless channels to the process control devices 310a-c. Because the interface on the wireless I/O card 302 to the wireless module 150 is the same interface utilized by the I/O cards 202, 132, and 134 to the wireless module 150 in FIGS. 1 and 2, the wireless module 150 may communicate with the wireless I/O card 302 (and/or the I/O cards 202, 132, and 134) in the same manner regardless of how the wireless I/O card 302 is communicatively coupled to the process control devices 310a-c. In the example of FIG. 3, communications forwarded by the wireless module 150 to the wireless I/O card 302 are converted and/or packaged into a wireless format and/or or protocol prior to transmission to the process control devices 310a-c. The process control devices 310a-c may then unpack (and/or de-packetize) the wireless communication.

In an example implementation of a pass-through communication session between the portable device 160 and the process control device 310a, the example wireless module 150 of FIG. 3 receives communications from the portable device 160 and forwards the communications via a virtual route to the wireless I/O card 302. The example wireless I/O card 302 unpacks or de-packetizes the communications in accordance with the wireless communication protocol associated with the portable device 160 and determines an I/O channel and/or wireless channel associated with the process control device 310a. The wireless I/O card 302 may identify the appropriate I/O channel and/or wireless channel by examining a message header within the unpacked communication with process control device identification information to extract or determine a device identifier (e.g., a device tag).

The wireless I/O card 302 then searches an internal database for the I/O channel and/or the wireless channel addressed and/or corresponding to the process control device 310a using the extracted or determined device identifier. Additionally, the wireless I/O card 302 may also determine the communication protocol used by the process control device 310a. Upon determining the I/O channel and/or wireless channel, the wireless card 302 packetizes the communication in accordance with a process control communication protocol associated with the process control device 310a and/or a wireless communication protocol and transmits the communication wirelessly to the process control device 310a.

Similarly, communications from the process control device 310a are received and unpacked by the wireless I/O card 302. The wireless I/O card 302 then examines a message header of the communications to determine that the message is destined for the portable device 160. The wireless I/O card 302 may then forward the communications to the wireless module 150 via the virtual route of the pass-through session. The wireless module 150 may then package and/or convert the communication in accordance with a wireless communication protocol and transmit the communication to the portable device 160.

Figure 4:
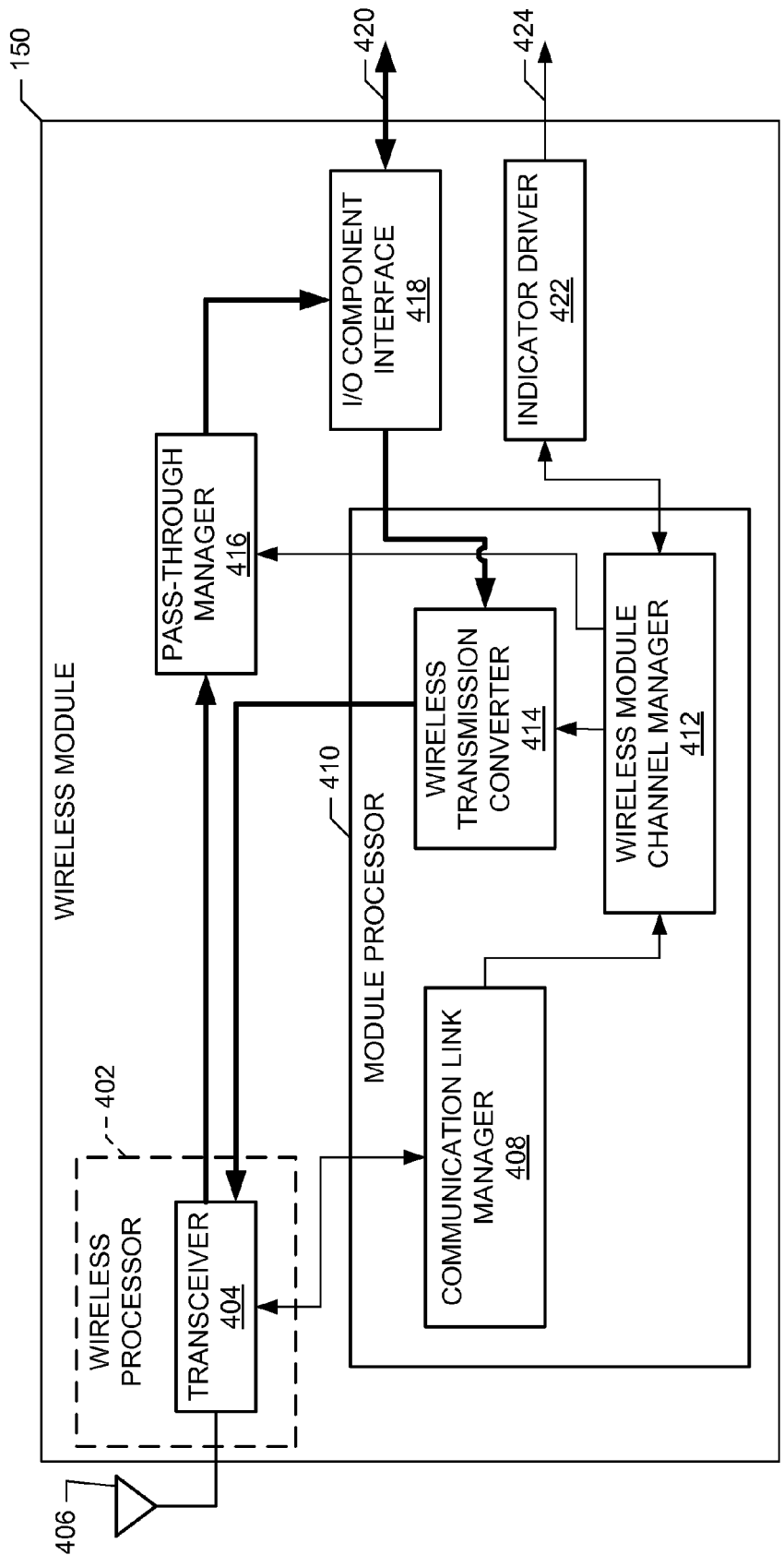
FIG. 4 is a block diagram of the example wireless module of FIGS. 1-3.

FIG. 4 is a block diagram of the example wireless module 150 of FIGS. 1-3. To transmit and receive communications wirelessly with the portable module 160 of FIGS. 1-3, the example wireless module 150 includes a wireless processor 402. The example wireless processor 402 may include any microcontroller, integrated circuit, signal processor, and/or component circuitry to process and/or manage wireless communications. Additionally, the wireless processor 402 includes a transceiver 404 that is communicatively coupled to an antenna 406. The example antenna 406 may include any type of antenna compliant with the transceiver 404.

The example transceiver 404 may include any type of wireless transmitter and wireless receiver. Additionally, the transceiver 404 can be implemented using a wireless communication medium (e.g., wireless Ethernet, IEEE-802.11, Wi-Fi®, Bluetooth®, etc.). For example, in Bluetooth® implementations, the transceiver 404 may include a Bluetooth® compliant transceiver. In these implementations, the wireless processor 402 may include a Bluetooth® signal processor, decoder, and/or management interface. The example transceiver 404 receives communications via electrical signals from the portable device 160 and converts the electrical signals into analog, discrete, and/or digital information for processing by the wireless processor 402. Additionally, the example transceiver 404 of FIG. 4 receives and converts analog, discrete, and/or digital information originating from an I/O component and/or a process control device into electrical signals to transmit to the portable device 160.

To manage communication links with portable devices (e.g., the portable device 160), the example wireless module 150 of FIG. 4 includes a communication link manager 408. The example communication link manager 408 is included within a module processor 410 that is configured to establish pass-through sessions and process communications. The communication link manager 408 receives request messages, connection messages, and/or identification request messages from the portable device 160 via the wireless processor 402. For example, upon the transceiver 404 receiving a communication from the portable device 160, the wireless processor 402 analyzes the contents of the communication. If the communication includes a request message, identification request message, and/or a connect message, the wireless processor 402 forwards the message to the communication link manager 408.

Upon receiving a request and/or an identification request message, the example communication link manager 408 may transmit identification information associated with the wireless module 150 to the portable device 160. This identification information may include a name (e.g., a serial number, device identification number, device location, etc.) of the wireless module 150 and/or an identifier of an I/O component communicatively coupled to the wireless module 150 that is preprogrammed and/or stored at the communication link manager 408. Additionally, this identification information may include protocol information, wireless channel frequency information, and/or authentication information that the portable device 160 may use to open or initialize a communication link with the wireless module 150. The communication link manager 408 may also store information (e.g., portable device identification information) associated with the portable device 160 that may be included within the request message. Furthermore, the communication link manager 408 may use the portable device identification information to manage multiple pass-through sessions when multiple portable devices are connected to the wireless module 150. Additionally, the communication link manager 408 may provide this information to the wireless processor 402 to maintain the communication link during wireless channel changes.

Upon receiving a request to connect message from the portable device 160, the example communication manager 408 may establish a communication link with the portable device 160 and store information associated with that communication link. The communication link manager 408 may store the information to a database (not shown) within the module processor 410. The communication link manager 408 also sends an acknowledgement message to the portable device 160 with identification information to indicate the communication link has been established. Additionally, the communication link manager 408 sends an instruction to a wireless module channel manager 412 including information associated with the newly formed communication link. Upon creating a communication link, the communication link manager 408 functions as a pass-through for instructions (e.g., communications) from the portable device 160 to the wireless module channel manager 412 to establish a virtual route.

The communication link manager 408 may maintain the communication link until a disconnect message is received from the portable device 160 via the wireless processor 402. Alternatively, the wireless processor 402 may send the communication link manager 408 a disconnect message if the transceiver 404 and/or the wireless processor 402 detects that communication with the portable device 160 has been lost (e.g., due to a timeout, lost proximity or out of range, etc.).

To initiate pass-through sessions, the example wireless module 150 of FIG. 4 includes the wireless module channel manager 412. The example wireless module channel manager 412 is included within the module processor 410 and is communicatively coupled to the communication link manager 408. Additionally, to establish a virtual route, the wireless module channel manager 412 is communicatively coupled to a wireless transmission converter 414 and a pass-through manager 416.

The example wireless module channel manager 412 initiates a virtual route upon a selection of an I/O card, I/O component, I/O channel, and/or process control device from the portable device 160. The wireless module channel manager 412 uses information included within the selection message such as, for example, an identification value of an I/O card, I/O component, I/O channel, and/or process control device to create the parameters and/or criteria for the virtual route to the selected device. Further, the wireless module channel manager 412 may update the virtual route based on additional selections by the portable device 160.

In an example, the portable device 160 may transmit a communication to the wireless module 150 that includes a selection of an I/O channel of an I/O card. The wireless processor 402 receives the communication, determines the communication is associated with establishing a virtual route, and forwards the communication to the wireless module channel manager 412 via the communication link manger 408. The wireless module channel manager 412 identifies information within the communication associated with the I/O card and/or the I/O channel. The wireless module channel manager 412 then sends an instruction to the pass-through manager 416 to create a pass-through session from the wireless processor 402 to the I/O card and/or I/O channel via a virtual route through the pass-through manager 416 and an I/O component interface 418. This virtual route through the pass-through manager 416 propagates communications transmitted from the portable device 160.

Additionally, the example wireless module channel manager 412 sends an instruction to the wireless transmission converter 414 to implement the pass-through session from the I/O card and/or I/O channel to the wireless processor 402. This pass-through session through the wireless transmission converter 414 establishes a virtual route for communications transmitted by the I/O card and/or I/O channel destined for the portable device 160.

Further, if the portable device 160 selects a process control device, the wireless module channel manager 412 may update the information associated with the pass-through session in the pass-through manager 416 and/or the wireless transmission converter 414 to establish the pass-through session to the process control device via the I/O card and/or I/O channel.

To enable communications between the portable device 160 and a selected I/O component and/or process control device, the example wireless module 150 of FIG. 4 includes the pass-through manager 416. The example pass-through manager 416 creates a virtual route from the wireless processor 402 to an I/O component and/or process control device based on instructions from the wireless module channel manager 412. The virtual route is created for the pass-through session and enables communications to be directly forwarded to the I/O component and/or process control device. The pass-through manager 416 creates virtual routes to isolate communications from different pass-through sessions that may correspond to other portable devices communicating with the wireless module 150.

The virtual route(s) managed by the pass-through manager 416 may accept and/or forward communications processed by the wireless processor 402 with a destination address specified by the wireless module channel manager 412. The pass-though manager 412 may then forward the approved communications to an I/O component and/or process control device via the virtual route(s) through the I/O component interface 418. In some examples, the I/O component uses the destination address within a header of the communication to determine the appropriate I/O channel and/or process control device to which the communication is to be routed.

In some example implementations, the pass-through manager 416 forwards communications from the wireless processor 402 that are packaged in a wireless communication protocol used to transmit the message from the portable device 160 (e.g., a Bluetooth® protocol). In these implementations, an I/O card coupled to the wireless module 150 may unpack the communication from the protocol. In other implementations, the pass-through manager 416 may unpack the communication from the wireless communication protocol prior to forwarding the communication along the virtual route.

Additionally, to enable communications between the portable device 160 and a selected I/O component and/or process control device, the example wireless module 150 of FIG. 4 includes the wireless transmission converter 414. The example wireless transmission converter 414 receives communications from an I/O component and/or a process control device via the I/O component interface 418 and packages the communication in accordance with a wireless communication protocol. The wireless transmission converter 414 then forwards the packaged communication to the wireless processor 402 for transmission to the portable device 160.

The wireless transmission converter 414 creates a virtual route from an I/O component and/or process control device to the wireless processor 402 based on instructions from the wireless module channel manager 412. The virtual route is created for the pass-through session and enables communications to be directly forwarded from the I/O component and/or process control device to the portable device 160. The wireless transmission converter 414 creates virtual routes to isolate communications from different pass-through sessions that may correspond to other portable devices communicating with the wireless module.

To package communications in accordance with a wireless communication protocol, the wireless transmission manager 414 may use portable device identification information provided by the wireless module channel manager 412. In other examples, the wireless transmission converter 414 may only forward communications along a virtual route while the wireless processor 402 packages communications for transmission. In these examples, the wireless transmission converter 414 may be combined with the pass-through manager 416.

To enable communication between the portable device 160 and process control devices and/or I/O components, the example wireless module 150 of FIG. 4 includes the I/O component interface 418. The example I/O component interface 418 enables communication via virtual routes created during a pass-through session. The I/O component interface 418 extends the virtual route (e.g., communication channel, and/or link) via a communication path 420 to the appropriate I/O component and/or process control device in a process control system (e.g., the process control system 100 of FIGS. 1-3). In some examples, the I/O component interface 418 may be communicatively coupled to an I/O card via a single wire. In these examples, the I/O component interface 418 manages the flow of communications such that communications transmitted from the I/O card are forwarded to the wireless transmission converter 414 and communications propagating from the pass-through manager 416 are forwarded to the I/O card without the bi-directional flow of these communications interfering with each other.

Alternatively, in examples where the I/O component interface 418 may be coupled to an I/O component and/or controller via a bus, the I/O component interface 418 may extend the virtual route through the bus to the I/O component and/or controller such that communications associated with the pass-through session are routed along the virtual route. During multiple pass-through sessions, the I/O component interface 418 manages the propagation of the communications to the appropriate destination (e.g., I/O component) via the corresponding virtual route to limit interference between the pass-through sessions.

In examples where the wireless module 150 is communicatively coupled to multiple I/O components, the I/O component interface 418 may determine to which I/O component communications are to be forwarded via the virtual route based on identification information included within a header of the communications. In other examples, the I/O component interface 418 may forward the communication to a controller (e.g., the controller 104) that manages the multiple I/O components, which then determines the appropriate I/O component to which the communications are to be forwarded. Further, in some examples, the I/O component interface 418 may determine a process control device associated with a selected I/O channel and/or I/O component by matching process control device information in the communication to identification information received from the selected I/O channel. The I/O component interface 418 may then forward the communication to the selected I/O channel.

Additionally, in examples where an I/O component is communicatively coupled to multiple process control devices, I/O cards, and/or I/O channels, the I/O component interface 418 may send the portable device 160 a list of the available process control devices, I/O cards, and/or I/O channels. In some examples, the I/O component interface 418 may send a message to a controller of the I/O card to receive a list of I/O cards or send a message to an I/O card to receive a list of available I/O channels and/or process control devices. Upon receiving the list, the I/O component interface 418 forwards the list to the portable device 160 via the wireless processor 402. In other examples, the I/O component interface 418 may maintain a database of available I/O components, I/O cards, I/O channels, and/or process control devices. In these examples, the I/O component interface 418 may transmit the list upon receiving an instruction from the portable device 160.

In an example, the I/O component interface 418 may establish a virtual route and/or communication channel with a process control device (e.g., a process control device) by identifying a corresponding I/O card. Upon receiving communications from the pass-through manager 416 with a destination address of the process control device in a header of the communication, the I/O component interface 418 forwards the communications to the identified I/O card. The I/O card then uses the identification information to determine the process control device, the I/O channel of the I/O card coupled to the process control device, and/or the communication protocol of the process control device. If the communications are not compliant with a protocol used by the process control device, the I/O card converts the communications into the appropriate protocol (and/or signal type) and transmits the communications to the process control device via the corresponding I/O channel.

Additionally, when the I/O card receives communications from the process control device, the I/O card converts the communications into a data format and/or protocol compliant with the wireless module 150 (which may be a data format that is compliant with the controller 104 of FIGS. 1-3). In some examples, the I/O card may forward all signals and/or communications from the process control device to the I/O component interface 418. In other examples, the I/O card may send the communications to the I/O component interface 418 and a communicatively coupled controller. In yet other examples, the I/O card may send communications to the I/O component interface 418 that have a destination address associated with the portable device 160. Upon receiving the communications from the I/O card, the I/O component interface 418 forwards the communications along the appropriate virtual route to the wireless processor 402 via the wireless transmission converter 414 for transmission to the portable device 160.

To control indicators (e.g., the indicators 206 and 306) associated with an I/O component and/or a process control device, the example wireless module 150 includes an indicator driver 422. The example indicator driver 422 is communicatively coupled to the indicators via a communication path 424 that may include any wired and/or wireless communication path(s). The indicator driver 422 may activate a light and/or sound generating device (e.g., a speaker) on an I/O component when the portable device sends a connect message to the wireless module channel manager 412.

Upon receiving the connect message, the wireless module channel manager 412 may then send the indicator driver 422 a message to activate an indicator associated with the selected I/O component and/or process control component. Activating an indicator in proximity of a selected I/O component and/or process control device may provide an operator and/or engineer visual and/or audio confirmation of the I/O component and/or process control device selected. The example indicator driver 422 of FIG. 4 may also deactivate an indicator upon receiving a command from the wireless module channel manager 412 that an I/O component and/or a process control device has been deselected.

While an example manner of implementing the wireless module 150 is depicted in FIG. 4, one or more of the interfaces, data structures, elements, processes and/or devices illustrated in FIG. 4 may be combined, divided, rearranged, omitted, eliminated and/or implemented in any other way. For example, the example wireless processor 402, the example transceiver 404, the example antenna 406, the example communication link manager 408, the example module processor 410, the example wireless module channel manager 412, the example wireless transmission converter 414, the example pass-through manager 416, the example I/O component interface 418, and/or the example indicator driver 422 illustrated in FIG. 4 may be implemented separately and/or in any combination using, for example, machine-accessible or readable instructions executed by one or more computing devices and/or computing platforms (e.g., the example processing platform P10 of FIG. 10).

Further, the example wireless processor 402, the example transceiver 404, the example antenna 406, the example communication link manager 408, the example module processor 410, the example wireless module channel manager 412, the example wireless transmission converter 414, the example pass-through manager 416, the example I/O component interface 418, the example indicator driver 422, and/or more generally, the example wireless module 150 may be implemented by hardware, software, firmware and/or any combination of hardware, software and/or firmware. Thus, for example, any of the example wireless processor 402, the example transceiver 404, the example antenna 406, the example communication link manager 408, the example module processor 410, the example wireless module channel manager 412, the example wireless transmission converter 414, the example pass-through manager 416, the example I/O component interface 418, the example indicator driver 422, and/or more generally, the example wireless module 150 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 5:
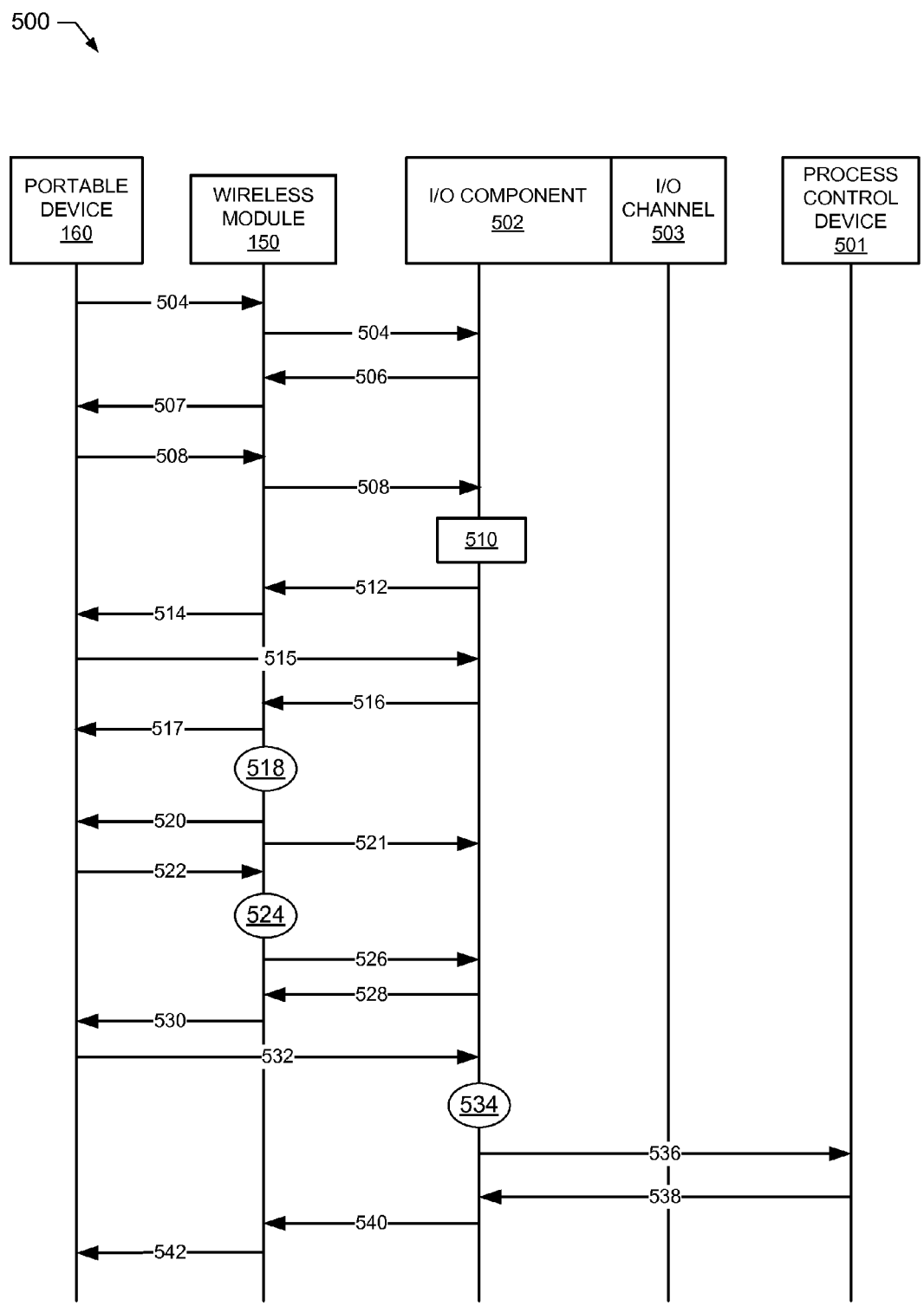
FIG. 5 is a flow diagram of communications between the portable device and a process control device via the example wireless module of FIGS. 1-4.

FIG. 5 is a flow diagram 500 of communications between the portable device 160 and a process control device 501 via the example wireless module 150 of FIGS. 1-4. The flow diagram 500 shows an I/O component 502 (e.g., a controller or an I/O card) communicatively coupled to the wireless module 150. Additionally, the I/O component 502 includes an I/O channel 503. The I/O channel 503 is communicatively coupled to the process control device 501, which may be similar to the process control devices 112a-c and/or 116a-c of FIGS. 1-3.

The example flow diagram 500 begins when the portable device 160 transmits using a wireless communication protocol a request message 504 for identification information. The example wireless module 150 receives the message and stores any portable device identification information that may be included within the message 504. The example wireless module 150 forwards the message 504 to an I/O component 502 (e.g., the I/O cards 132, 134, 202, and/or 302 and/or the controller 104 of FIGS. 1-3). Upon receiving the message 504, the I/O component 502 unpacks the message 504 in accordance with the wireless communication protocol, deciphers the message 504, and responds by sending identification information in a response message 506. The wireless module 150 receives the response message 506, packages the message 506 in accordance with the wireless communication protocol, and transmits a packaged response message 507 to the portable device 160. At this point, the portable device 160 may display identification information associated with the I/O component 502. Additionally, in some examples, the wireless module 150 may also send identification information about itself to the portable device 150 in the packaged response message 507 and/or a second packaged response message (not shown).

Next, the portable device 160 may send a connect message 508 to the wireless module 150 packaged in accordance with the wireless communication protocol. The example wireless module 150 receives the message 508, identifies the message 508 as a connect message, and begins to establish a communication link. Additionally, the wireless module 150 forwards the connect message 508 to the I/O component 502. The I/O component 502 initiates an authentication session 510 to determine if the portable device 160 is allowed to access the I/O component 502 and/or the process control device 501. The I/O component 502 then transmits an authentication request message 512. The authentication request message 512 may include security information used by the portable device 160 to prompt a user for security credentials. In some examples, the access may be restricted based on the process control device 501 and/or based on access to the I/O component 502. This authentication request message 512 is packaged in accordance with a wireless communication protocol by the wireless module 150 and transmitted to the portable device 160 as a packaged authentication request message 514.

The example flow diagram 500 continues when the portable device 150 transmits credentials of the operator and/or engineer via an authentication response message 515. The wireless module 150 receives and forwards the message 515 to the I/O component 502. The I/O component 502 unpacks the message and determines if the credentials are authorized. If the portable device 160 is authorized, the I/O component 502 sends an approval message 516, which is packaged by the example wireless module 150 in accordance with a wireless communication protocol and transmitted to the portable device 160 via a packaged approval message 517. Further, the wireless module 150 may establish a communication link 518 with the portable device 160 upon receiving and forwarding the approval message 516. Upon establishing the communication link 518, the wireless module 150 transmits an acknowledgment message 520 to indicate to the portable device 160 the creation of the communication link 518. The acknowledgment message 520 may include frequency, wireless channel information, and/or protocol information necessary for the portable device 160 to maintain the communication link 518 with the wireless module 150. The acknowledgment message 520 may also include identification information associated with the I/O component 502 and/or the process control device 501. Additionally, upon initializing the communication link 518, the example wireless module 150 may transmit an indicator message 521 to the I/O component 502 to activate an indicator associated with the I/O component 502.

The example flow diagram 500 of FIG. 5 continues when the portable device 160 sends a selection message 522 associated with the I/O component 502 and/or the process control device 501. The wireless module 150 uses the information within the selection message 522 to establish a pass-through session 524. The wireless module 150 then creates a virtual route through the wireless module 150 to the I/O component 502. At this point, the wireless module 150 has established a pass-through session so that communications from the portable device 160 may be transmitted by the example wireless module 150 directly to the I/O component 502 and/or the process control device 501.

The example wireless module 150 may then transmit the selection of the I/O component 502 to the I/O component via a second selection message 526. Upon receiving the second selection message 526, the I/O component 502 transmits a list of available process control devices (e.g., the process control device 501) within a list message 528. The list message 528 may include status information associated with process control devices communicatively coupled to the I/O component 502 including the process control device 501. The wireless module 150 receives the list message 528, packages the message 528 in accordance with a wireless communication protocol and sends a packaged list message 530 to the portable device 160. In other examples, the I/O component 502 may transmit the list message 528 upon authorizing the security credentials during the authentication session 510.

Next, the portable device 160 may transmit a selection to communicate directly with the process control device 501 via a selection message 532. The wireless module 150 forwards the selection message 532 in a packaged wireless communication protocol to the I/O component 502. The I/O component 502 then unpacks the message 532 and performs a lookup session 534 to identify the process control device 501 indicated in the message 532. The I/O component 502 also identifies the I/O channel 503 associated with and communicatively coupled to the process control device 501. During the lookup session 534, the I/O component 502 may also convert the message 532 into a format compatible with the process control device 501. The I/O component 502 then transmits a device message 536 with the contents of the message 532 to the process control device 501 via the I/O channel 503.

Upon receiving the message 536, the process control device 501 generates a response and transmits a reply message 538 that includes the response. The response may include identification information, status information, diagnostic information, and/or any other information that may be requested by the portable device 160. The I/O component 502 receives the message 538, converts the information within the message 538 into a format compliant with the wireless module 150, and forwards a compliant reply message 540 to the wireless module 150. The wireless module 150 then packages the reply message 540 into a wireless communication protocol reply message 542 and transmits the message 542 to the portable device 160. The portable device 160 may continue to communicate with the process control device 501 until the portable device 160 deselects the process control device 501 and/or the I/O component 502 and/or terminates the communication link with the wireless module 150.

Figure 6:
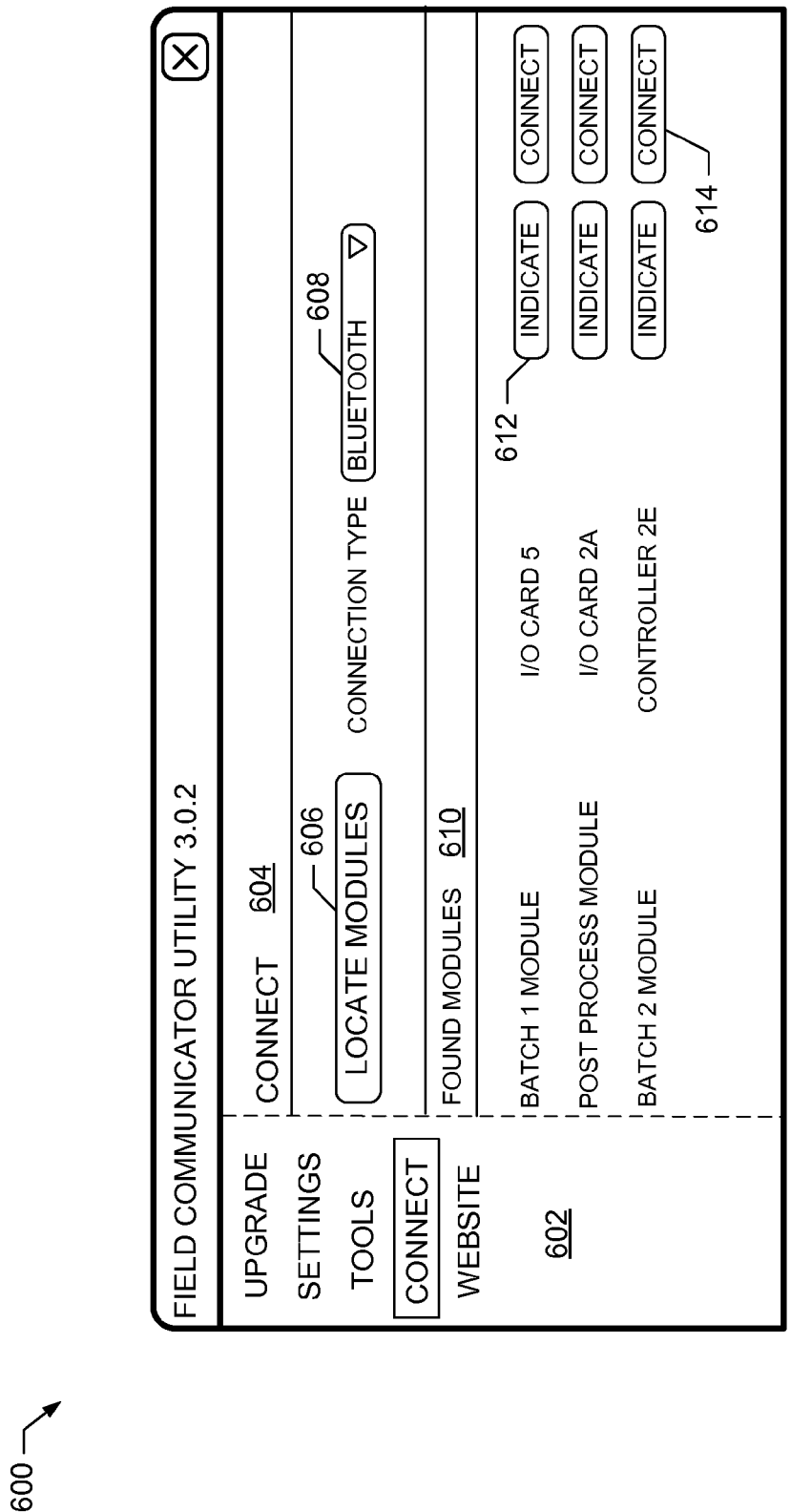
FIG. 6 is a diagram of a user interface on the portable device of FIGS. 1-3 showing information to connect to example wireless modules.

FIG. 6 is a diagram of a user interface 600 that may be implemented on the portable device 160 of FIGS. 1-3 showing information to connect to wireless modules. The example user interface 600 may be displayed on a screen of the portable device 160. While FIG. 6 shows one example implementation of the user interface 600, other example implementations may show additional information, less information, and/or show the information displayed in a different manner (e.g., in a Adobe™ Flash application). In the example of FIG. 6, the user interface 600 may be displayed using Electronic Device Description Language (EDDL) that includes information describing how to display identification information and/or status information received in the portable device.

The example user interface 600 includes a menu section 602 that enables a user to select different menu items for configuring and/or using the portable device 160. In this example, the CONNECT menu item is selected in the menu section 602. Selecting the CONNECT menu item displays a Connect menu section 604 that includes a Locate Modules function 606 and a Connection Type function 608. A user may use the Connect menu section 604 to instruct the portable device 160 to transmit identification request messages, request messages, and/or connect messages to wireless modules. To transmit messages, the user may select a wireless communication protocol type via the Connection type function 608 and select the Locate Modules function 606. The portable device 160 may then transmit and/or broadcast request messages to any wireless modules within proximity.

The example user interface 600 of FIG. 6 also includes a Found Modules menu section 610 that displays I/O components that are communicatively coupled to a wireless module that are in communication range of the portable device 160. The portable device 160 displays the identification information in the Found Modules menu section 610 upon receiving identification response messages from the listed I/O components. In this example, upon selecting the Locate Modules function 606, the portable device 160 receives three identification response messages from an I/O Card 5, an I/O card 2A, and a Controller 2E. The Found Modules menu section 610 also includes a field for additional information about the located I/O components (e.g., Batch 1 Module).

Further, the user may select an I/O component to view additional information associated with the I/O component. The user may also select an Indicate function 612 to instruct the portable device 160 to send an indicate message to the respective wireless module. The wireless module then sends the indicate message to the respective I/O component to activate an indicator so that the user may visually or otherwise locate the I/O component within a process control system. The Found Modules menu section 610 also includes respective Connect functions 614 to instruct the portable device 160 to transmit a connect message to the respective wireless module and/or I/O component.

Figure 7:
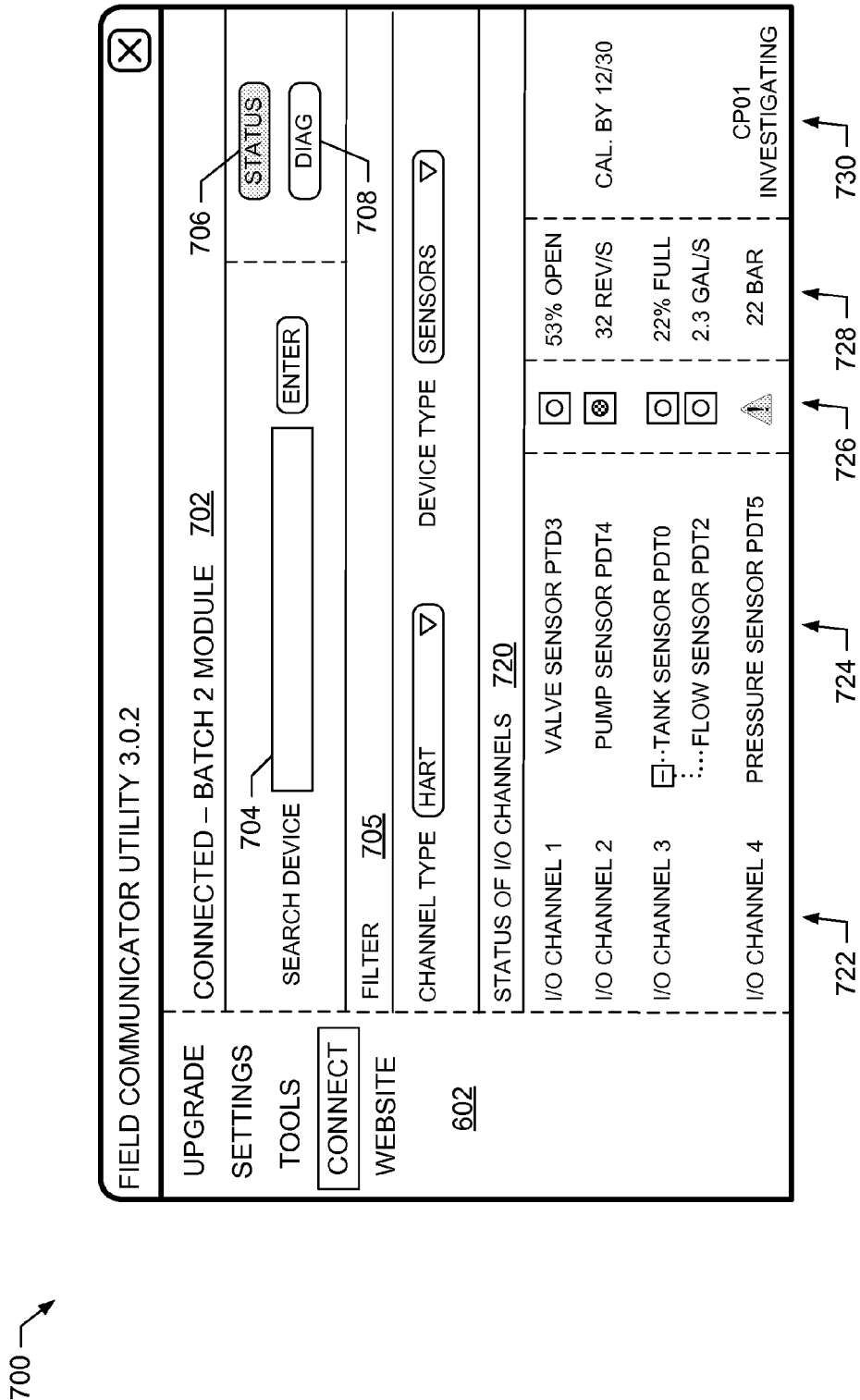
FIG. 7 is a diagram of a user interface on the portable device of FIGS. 1-3 showing status information of available process control devices to which the example wireless module of FIGS. 1-4 may be communicatively coupled.

FIG. 7 is a diagram of a user interface 700 on the portable device 160 of FIGS. 1-3 showing status information of available process control devices to which the example wireless module 150 of FIGS. 1-4 may be communicatively coupled.

The example user interface 700 may be displayed upon the user having security credentials authenticated by the selected I/O component (e.g., the Batch 2 Module) and after the wireless module 150 establishes a communication link with the portable device 160. The example user interface 700 may also be displayed after the wireless module 150 has initiated a pass-through session to the Batch 2 Module I/O component.

The example user interface 700 includes a Connect menu section 702 that enables a user to search for a process control device via a search function 704. The user may search for a process control device by identification information, general characteristics (e.g., Batch 2 components with issues), and/or by location within a process control system. The example user interface 700 also includes a Filter section 705 that enables a user to filter search results based on a channel type (e.g., via a Channel Type function) and/or a device type (e.g., via a Device Type function). The Channel Type function enables a user to sort through results based on a communication protocol of process control devices. In this example, the HART® protocol is selected to view available process control devices that communicate with the Batch 2 Module via HART®. The Device Type function enables a user to filter search results by selecting a type of a process control device. In this example, a device type of sensors is selected so that only sensor process control devices are displayed within the user interface 700. Other example implementations may include other filter functions.

The Connect menu section 702 further includes a Status function 706 and a Diagnostic function 708 to instruct the portable device 160 to display status information and diagnostic information respectively within the user interface 700. In the example of FIG. 7, the Status function 706 is shaded to indicate a selection to display status information within the user interface 700.

By selecting the Status function 706, a Status menu section 720 displays process control information associated with process control devices selected in the Filter section 705. The example user interface 700 shows status fields 722-730 displaying the process control information. For example, the status field 722 shows the name of the I/O channel on the Batch 2 Module I/O component. The status field 724 shows the name (e.g., identifier) of a process control device communicatively coupled to the respective I/O channel. The I/O channel 3 shows that two process control devices (e.g., Tank Sensor PDT0 and Flow Sensor PDT2) are communicatively coupled to the same I/O channel. The status field 726 shows a graphic status of an operating condition of the process control devices. The status field 728 shows process control output data measured by the process control devices and the status field 730 shows an information field that may provide additional information associated with the respective process control device.

The example Status menu section 720 enables a user to relatively quickly determine the status of process control devices communicatively coupled to a common I/O component. The status information displayed in the Status menu section 720 may be received by the portable device 160 upon the creation of a communication link with the wireless module. In other examples, the list of status information may be provided by the I/O component upon the user selecting the I/O component and the wireless module 150 initializing a pass-through session. In some examples, a user may select to view more information associated with a listed process control device (e.g., as described in FIG. 8). Additionally, a user may select a process control device to instruct the portable device to activate an indicator associated with the selected process control device.

Figure 8:
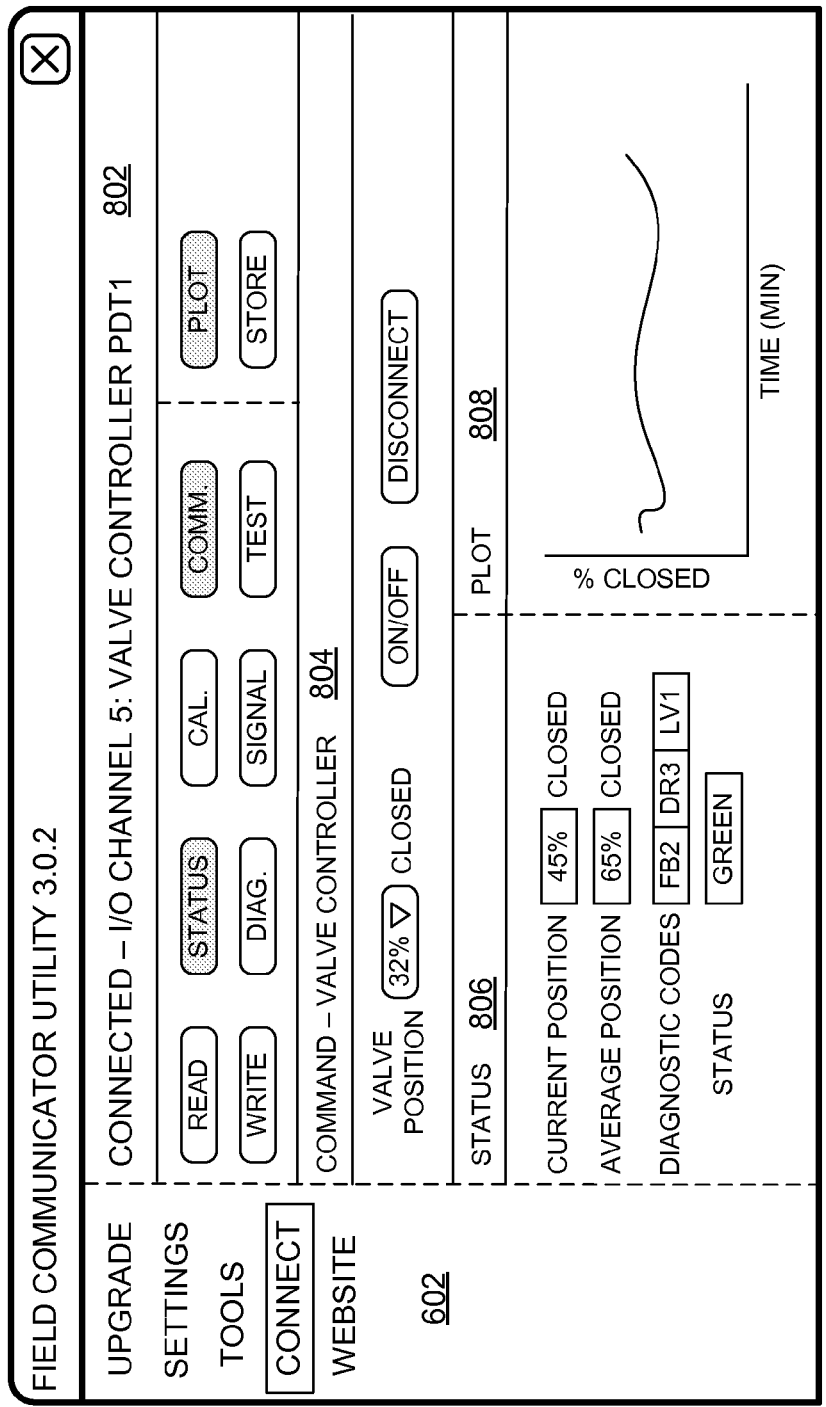
FIG. 8 is a diagram of a user interface on the portable device of FIGS. 1-3 showing additional status information of a process control device that is communicatively coupled to the example wireless module of FIGS. 1-4.

FIG. 8 is a diagram of a user interface 800 on the portable device 160 of FIGS. 1-3 showing additional status information of a process control device that is communicatively coupled to the example wireless module 150 of FIGS. 1-4. In this example, the wireless module 150 has initiated a pass-through session and created a virtual route to the I/O Channel 5 so that the portable device 160 may communicate directly with a valve controller PDT1 (e.g., a process control device). The example user interface 800 shows status information associated with the valve controller PDT1 that may have been selected from the user interface 700 of FIG. 7 when the Device Type is changed to field controllers.

To provide the user with different information display options and/or commands, the user interface 800 includes an options menu section 802. The example options menu section 802 includes functions (e.g., Status, Diagnostics (Diag.), Signal, and Communications (Comm.)) for displaying data from the valve controller PDT1 that may be preformatted based on the device type. Additionally, the options menu section 802 includes command functions (e.g., Read, Write, Calibration (Cal.) and Test) for sending instructions to the valve controller PDT1. Further, the options menu section 802 includes functions (e.g., Plot and Store) for managing process control data received from the valve controller PDT1. In other examples, the options menu section 802 may include additional or fewer commands, data functions, and/or display options.

The example user interface 800 of FIG. 8 includes a Command menu section 804 to enable a user to transmit an instruction from the portable device 160 to the valve controller PDT1. The Command menu section 804 may be formatted based on a type of process control device. In this example, the Command menu section 804 includes a Valve Position command to instruct the valve controller PDT1 as to what position to move a valve. The Command menu section 804 includes an On/Off function to transmit the position set in the Valve Position function and a Disconnect function to end direct communications with the valve controller PDT1.

Additionally, the example user interface 800 includes a Status section 806 for displaying process control information associated with the valve controller PDT1 and a Plot section 808 to show a history of process control information associated with the valve controller PDT1. The Status section 806 may be displayed upon a selection of the Status function in the options menu section 802. Similarly, the Plot section 808 may be displayed upon a selection of the Plot function in the menu section 802. While the user interface 800 shows the Status section 806 and the Plot section 808, in other examples, the user interface 800 may show additional process control information or less process control information.

Figure 9A:
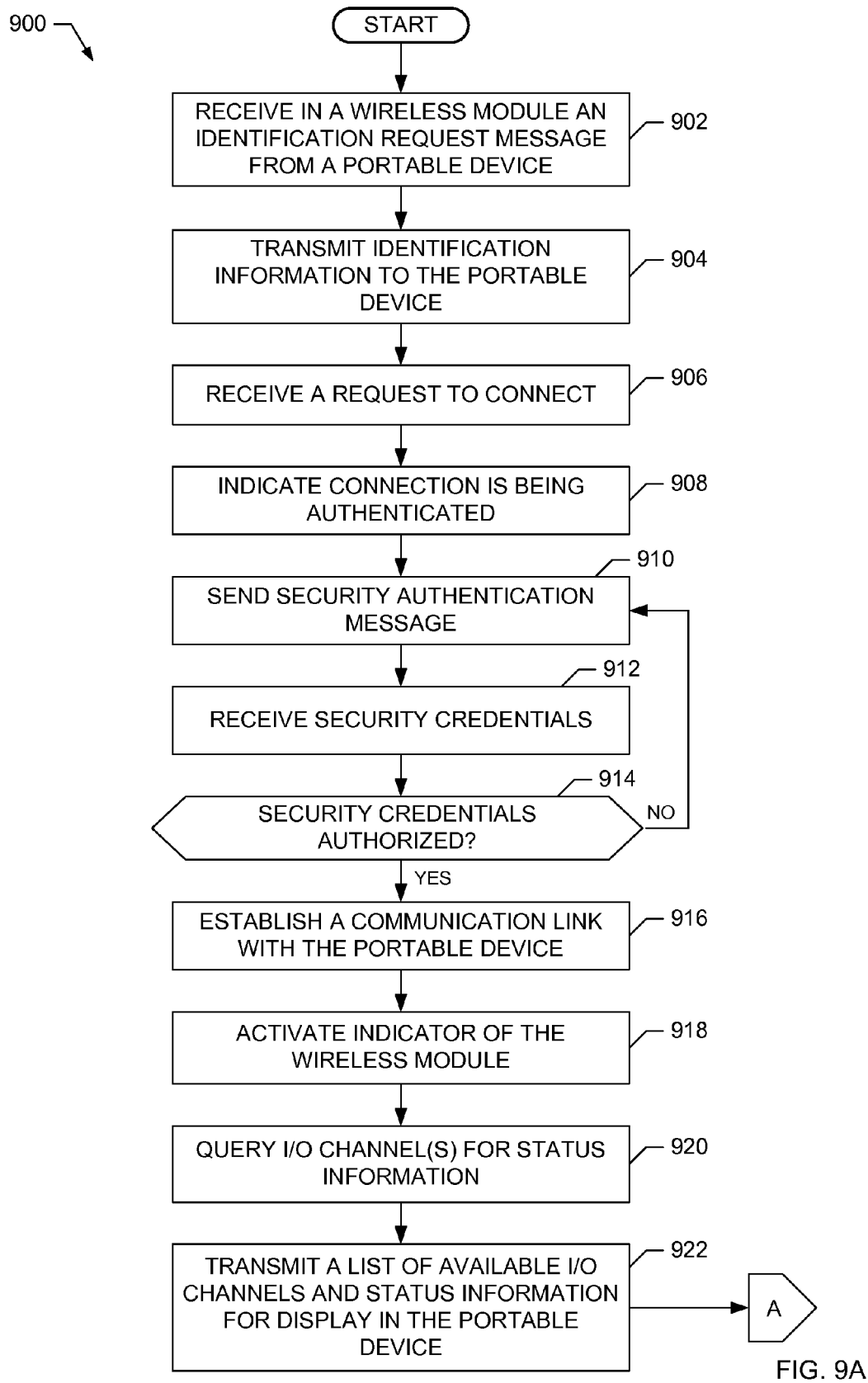
FIGS. 9A and 9B are a flowchart of example methods that may be used to implement the example wireless module of FIGS. 1-4, the portable device of FIGS. 1-3, and/or the example process control system of FIGS. 1-3.
Figure 9B:
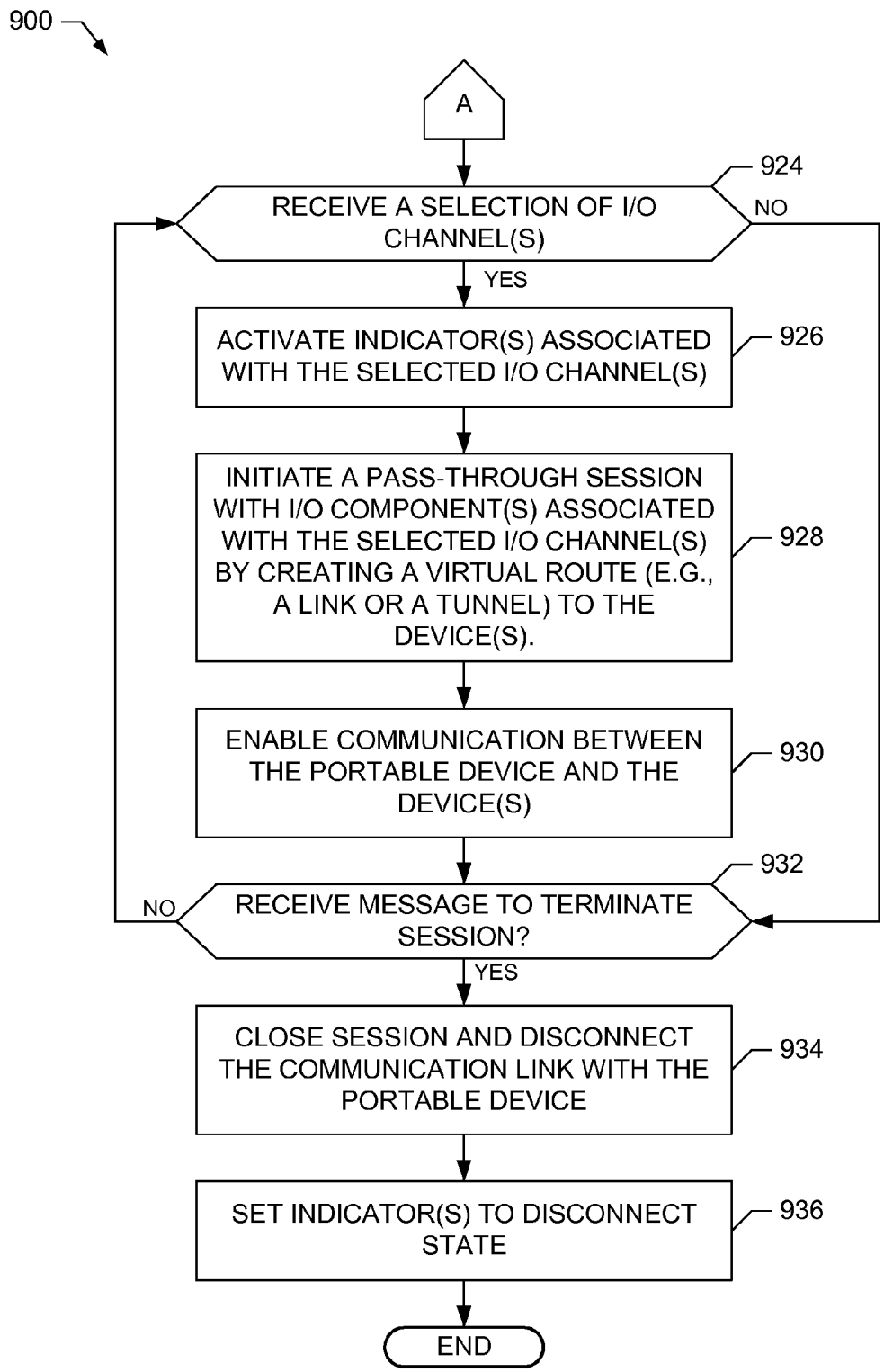

FIGS. 9A and 9B are a flowchart of example methods that may be carried out to implement the example wireless processor 402, the example transceiver 404, the example communication link manager 408, the example module processor 410, the example wireless module channel manager 412, the example wireless transmission converter 414, the example pass-through manager 416, the example I/O component interface 418, the example indicator driver 422, and/or more generally, the example wireless module 150 of FIGS. 1-4. The example methods of FIGS. 9A and 9B may be carried out by a processor, a controller and/or any other suitable processing device. For example, the example methods of FIGS. 9A and 9B may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 10). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example methods of FIGS. 9A and 9B may be implemented using any combination(s) of ASIC(s), PLD(s), FPLD(s), discrete logic, hardware, firmware, etc.

Also, some or all of the example methods of FIGS. 9A and 9B may instead be implemented using manual operations or as any combination of any of the foregoing techniques, for example, any combination of firmware, software, discrete logic and/or hardware. Furthermore, many other methods of implementing the example operations of FIGS. 9A and 9B may be employed. For example, the order of execution of the blocks may be changed, and/or one or more of the blocks described may be changed, eliminated, sub-divided, or combined. Additionally, any or all of the example methods of FIGS. 9A and 9B may be carried out sequentially and/or carried out in parallel by, for example, separate processing threads, processors, devices, discrete logic, circuits, etc.

The example method 900 of FIGS. 9A and 9B initializes a pass-through session from a portable device to a process control device. Multiple example methods 900 may be executed in parallel or series to initialize different pass-through sessions. Additionally, in examples where multiple portable devices are communicatively coupled to a wireless module, an example method 900 may be implemented for each portable device or, alternatively, a single example method 900 may be implemented for the portable devices.

The example method 900 of FIG. 9A begins when the wireless module 150 of FIGS. 1-4 receives a request and/or an identification request message from a portable device (e.g., the portable device 160) (block 902). The example method 900 then transmits identification information to the portable device (block 904). In other examples, the example method 900 may transmit the identification information to the portable device in an acknowledgement message upon establishing a communication link. Next, the wireless module 150 receives a request to connect message from the portable device (block 906). In other examples, the portable device may send the request to connect message upon receiving acknowledgment that the portable device is authorized to connect to an I/O component, process control device, and/or the wireless module 150.

The example method 900 of FIG. 9A continues when the example method 900 (e.g., via an I/O component and/or the wireless module) indicates that a connection is being authenticated (block 908). The example method 900 (e.g., the wireless module 150) may then transmit a security authentication message to the portable device to prompt a user of the portable device to provide security credentials (block 910). Next, the example method 900 (e.g., the wireless module 150) receives the security credentials and forwards the credentials to an I/O component (block 912). The example method 900 (e.g., the I/O component) determines if the portable device is authorized to connect to the wireless device 150 and/or the I/O component (block 914).

If the credentials are not authorized, the example method 900 (e.g., the I/O component) may transmit another security authentication message (block 910). The example method 900 may continue to request proper authentication until security credentials are approved or until the operator has reached a threshold of login attempts. However, if the credentials are authorized (block 914), the example method 900 (e.g., the wireless module 150) may establish a communication link with the portable device (block 916). In some examples, the example method 900 may also provide identification information associated with the wireless module 150 and/or an I/O component.

Further, the example method 900 (e.g., the wireless module) may activate an indicator associated with the wireless module 150 and/or the I/O component (block 918). Additionally, the example method 900 (e.g., the wireless module 150) may query the I/O component and/or I/O channels associated with the I/O component for status information corresponding to process control devices communicatively coupled to the I/O component (block 920). The example method 900 (e.g., the wireless module 150) then transmits a list of available I/O channels, (and/or process control devices) and corresponding status information to the portable device (block 922). In some examples, the list of available I/O channels and status information may be included within the identification information transmitted to the portable device upon establishing a communication link. In other examples, the example method 900 may only transmit the list of available I/O channels and corresponding status information upon a selection of an I/O component and/or an I/O channel by the portable device.

The example method 900 of FIG. 9B continues by determining if a selection of one or more I/O channels and/or process control devices has been received (block 924). If a selection has been received, the example method 900 (e.g., the wireless module 150) activates an indicator associated with the selected I/O channels and/or the process control devices (block 926). The example method 900 (e.g., the wireless module) then initiates a pass-through session with the I/O components associated the selected I/O channels and/or process control devices by creating a virtual route to the process control devices (block 928). In other examples, the example method 900 may initiate a pass-through session upon receiving a selection of an I/O component.

Next, the example method 900 (e.g., the wireless module) enables communication between the portable device and the selected process control devices via the corresponding I/O channels (block 930). At this point, the portable device may communicate with the selected process control devices as though the portable device was directly communicatively coupled to the process control devices.

While the pass-through session is operational, the example method 900 (e.g., the wireless module 150) determines if a message to terminate the session has been received (block 932). Additionally, if the example method 900 has not received a selection of an I/O channel (block 924), the example method 900 determines if a message to terminate the session has been received (block 932). If a terminate message has not been received, the example method 900 determines if a selection of an I/O channel and/or process control device has been received (block 924).

However, if the example method 900 (e.g., the wireless module 150) determines that a terminate session message has been received (block 932), the example method 900 closes the pass-through session and disconnects the communication link with the portable device (block 934). Additionally, the example method 900 may set the active indicator(s) to an inactive and/or disconnect state (block 936). The example method 900 then ends.

Figure 10:
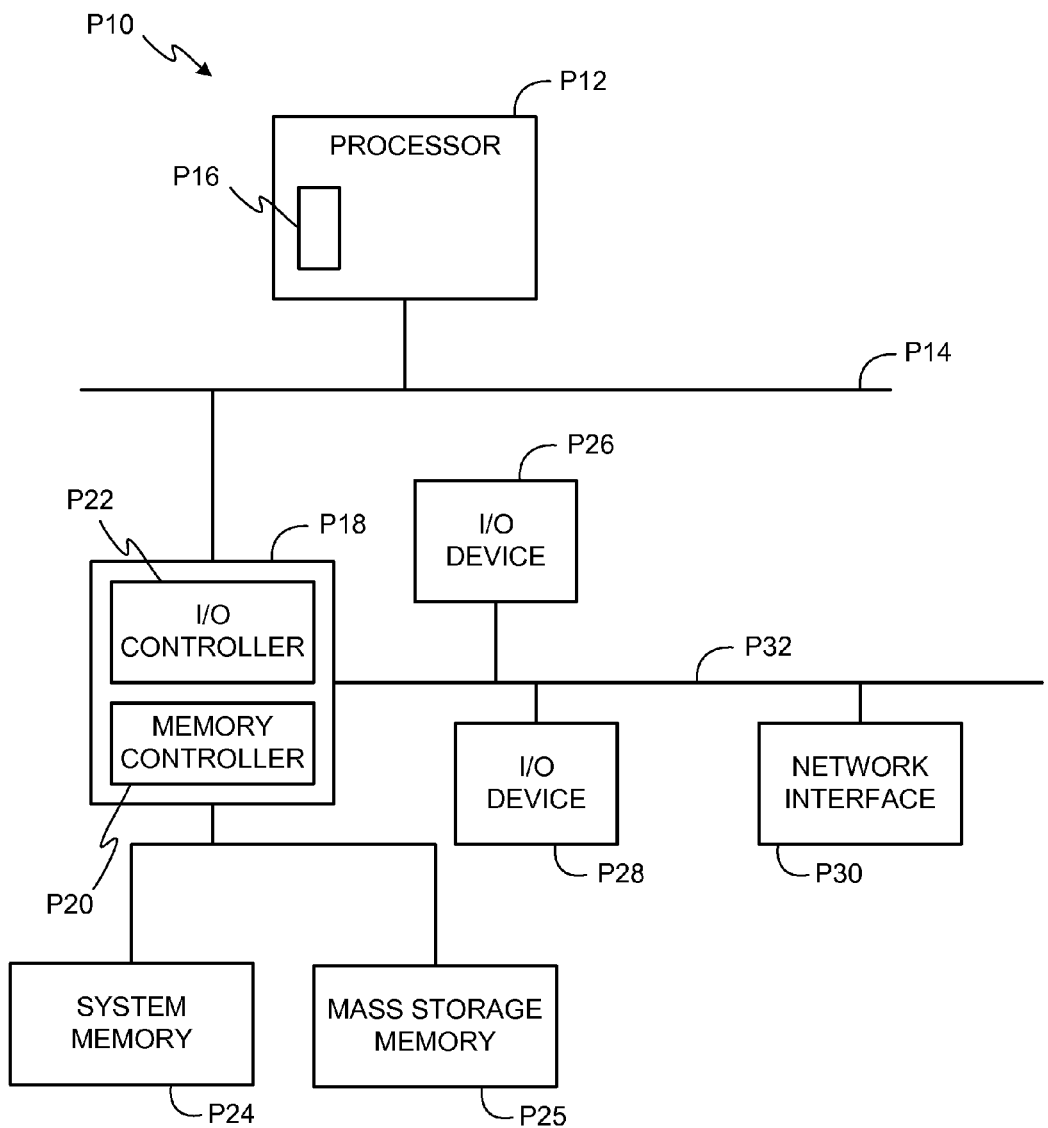
FIG. 10 is a block diagram of an example processor system that may be used to implement the example methods and systems described herein.

FIG. 10 is a block diagram of an example processor system P10 that may be used to implement the example methods and apparatus described herein. For example, processor systems similar or identical to the example processor system P10 may be used to implement the example wireless processor 402, the example transceiver 404, the example communication link manager 408, the example module processor 410, the example wireless module channel manager 412, the example wireless transmission converter 414, the example pass-through manager 416, the example I/O component interface 418, the example indicator driver 422, and/or more generally, the wireless module 150 of FIGS. 1-4. Although the example processor system P10 is described below as including a plurality of peripherals, interfaces, chips, memories, etc., one or more of those elements may be omitted from other example processor systems used to implement one or more of the example wireless processor 402, the example transceiver 404, the example antenna 406, the example communication link manager 408, the example module processor 410, the example wireless module channel manager 412, the example wireless transmission converter 414, the example pass-through manager 416, the example I/O component interface 418, the example indicator driver 422, and/or more generally, the wireless module 150.

As shown in FIG. 10, the processor system P10 includes a processor P12 that is coupled to an interconnection bus P14. The processor P12 includes a register set or register space P16, which is depicted in FIG. 10 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 10, the system P10 may be a multi-processor system and, thus, may include one or more additional processors that are identical or similar to the processor P12 and that are communicatively coupled to the interconnection bus P14.

The processor P12 of FIG. 10 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the wireless module (FIG. 4), the mass storage memory P25 may include a hard disk drive, an optical drive, a tape storage device, etc. Alternatively, if the example processor system P10 is used to implement the module processor 410, the mass storage memory P25 may include a solid-state memory (e.g., a flash memory, a RAM memory, etc.), a magnetic memory (e.g., a hard drive), or any other memory suitable for mass storage in the module processor 410.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to communicatively couple a portable device to a process control device in a process control system, the method comprising:
    receiving via a wireless module a selection of an input/output (I/O) channel from a portable device;
    determining a process control device associated with the selected I/O channel;
    initiating a pass-through session from the wireless module to the determined process control device via the I/O channel; and
    enabling communication between the portable device and the process control device via the pass-through session to communicatively couple the portable device to the process control device.

2. A method as defined in claim 1, further comprising, prior to receiving the selection from the portable device:
    receiving via the wireless module an identification request message transmitted from the portable device;
    transmitting identification information from the wireless module to the portable device;
    receiving via the wireless module a request to connect message from the portable device; and
    establishing a communication link between the wireless module and the portable device.

3. A method as defined in claim 2, further comprising, upon receiving the request to connect message, activating an indicator associated with the wireless module.

4. A method as defined in claim 3, wherein the indicator includes at least one of a flashing light, a flashing light emitting diode, or an output of an audio signal.

5. A method as defined in claim 1, wherein initiating the pass-through session includes creating a virtual route from the portable device through the wireless module to the selected I/O channel via an I/O card that corresponds to the selected I/O channel.

6. A method as defined in claim 5, wherein enabling the communication between the portable device and the process control device via the pass-through session includes at least one of:
    packaging a communication transmitted from the process control device in accordance with a wireless communication protocol prior to transmitting the communication to the portable device; or
    unpacking a communication transmitted from the portable device from a wireless communication protocol and transmitting the unpacked communication via a digital bus to the process control device.

7. A method as defined in claim 6, wherein the digital bus employs at least one of a Foundation Fieldbus protocol, a Profibus protocol, a Highway Addressable Remote Transducer protocol, a wireless Highway Addressable Remote Transducer protocol, or an electronic device description language protocol.

8. A method as defined in claim 1, further comprising forwarding at least one of a read message, a write message, a subscribe message, or a command message from the portable device to the process control device via the pass-through session.

9. A method as defined in claim 1, further comprising forwarding at least one of status information, signal information, diagnostic information, or identification information from the process control device to the portable device via the pass-through session.

10. A method as defined in claim 1, further comprising:
    determining two or more available process control devices associated with the selected I/O channel;
    sending a list of the available two or more process control devices to the portable device;
    receiving in the wireless module a selection of a second process control device from the portable device;
    initiating the pass-through session from the wireless module to the second process control device via the I/O channel; and
    enabling communication between the portable device and the second process control device via the pass-through session.

11. A method as defined in claim 1, further comprising:
    receiving a selection of at least one of two or more process control devices or two or more I/O channels;
    initiating the pass-through session from the wireless module to at least one of the process control devices or at least one of the I/O channels; and
    enabling communication between the portable device and the at least one of the process control devices or the I/O channels via the pass-through session.

12. A method as defined in claim 1, further comprising, prior to receiving the selection of the I/O channel, sending a list of available I/O channels to the portable device.

13. A method as defined in claim 1, further comprising, upon receiving the selection from the portable device, activating an indicator associated with the process control device.

14. An apparatus to communicatively couple a portable device to a process control device in a process control system, the apparatus comprising:
    a wireless processor to receive a selection of an input/output (I/O) channel from a portable device;
    a wireless module channel manager to initiate a pass-through session from the wireless module to a process control device via the I/O channel; and
    an I/O component interface to enable communication between the portable device and the process control device via the pass-through session to communicatively couple the portable device to the process control device.

15. An apparatus as defined in claim 14, wherein the I/O component interface is to determine the process control device associated with the selected I/O channel by receiving identifying process control device identification information from the selected I/O channel.

16. An apparatus as defined in claim 14, wherein the selection of the I/O channel is the same as a selection of an I/O component associated with the I/O channel.

17. An apparatus as defined in claim 14, further comprising a communication link manager to:
    receive an identification request message transmitted from the portable device;
    transmit identification information to the portable device via the wireless processor;
    receive a request to connect message from the portable device; and
    establish a communication link with the portable device.

18. An apparatus as defined in claim 17, further comprising an indicator driver to activate an indicator associated with the wireless module channel manager.

19. An apparatus as defined in claim 18, wherein at least one of the wireless processor, the communication link manager, the wireless module channel manager, the I/O component interface, or the indicator driver is included within a wireless module.

20. An apparatus as defined in claim 14, wherein the wireless module channel manager is to initiate the pass-through session by creating a virtual route from the portable device through the I/O component interface to the selected I/O channel via an I/O component that corresponds to the selected I/O channel.

21. An apparatus as defined in claim 20, wherein the I/O component interface is to enable the communication between the portable device and the process control device via the pass-through session by communicatively coupling to at least one of:
   a wireless transmission converter that is to:
      receive the communication from the I/O component interface; and
      package the communication in accordance with a wireless communication protocol prior to transmitting the communication to the portable device; or
   a pass-through manager that is to forward the communication to the process control device via the I/O component interface.

22. An apparatus as defined in claim 21, wherein the pass-through manager is to:
   unpack the communication transmitted from the portable device from a wireless protocol; and
   forward the unpacked communication to the process control device via the I/O component interface.

23. An apparatus as defined in claim 14, wherein the I/O component interface is to:
   determine two or more available process control devices associated with the selected I/O channel; and
   send a list of the available two or more process control devices to the portable device.

24. An apparatus as defined in claim 23, wherein:
   the wireless processor is to receive a selection of a second process control device from the portable device;
   the wireless module channel manager is to initiate the pass-through session to the second process control device via the I/O channel; and
   the I/O component interface is to enable communication between the portable device and the second process control device via the pass-through session.

25. A tangible machine-accessible memory device comprising instructions that, when executed, cause a machine to at least:
   receive a selection of an input/output (I/O) channel from a portable device;
   determine a process control device associated with the selected I/O channel;
   initiate a pass-through session to the determined process control device via the I/O channel; and
   enable communication between the portable device and the process control device via the pass-through session to communicatively couple the portable device to the process control device.

* * * * *